United States Patent
McCarthy, III et al.

(10) Patent No.: US 9,912,492 B2
(45) Date of Patent: Mar. 6, 2018

(54) DETECTION AND MITIGATION OF WATER LEAKS WITH HOME AUTOMATION

(71) Applicant: EchoStar Technologies, LLC, Englewood, CO (US)

(72) Inventors: Bernard Anthony McCarthy, III, Atlanta, GA (US); David Kummer, Highlands Ranch, CO (US)

(73) Assignee: ECHOSTAR TECHNOLOGIES INTERNATIONAL CORPORATION, Englewood, CO (US)

( * ) Notice: Subject to any disclaimer, the term of this patent is extended or adjusted under 35 U.S.C. 154(b) by 575 days.

(21) Appl. No.: 14/485,038

(22) Filed: Sep. 12, 2014

(65) Prior Publication Data

US 2015/0160663 A1    Jun. 11, 2015

Related U.S. Application Data

(60) Provisional application No. 61/914,856, filed on Dec. 11, 2013.

(51) Int. Cl.
   *E05B 47/00*      (2006.01)
   *G05B 11/01*      (2006.01)
   (Continued)

(52) U.S. Cl.
   CPC ...... *H04L 12/2825* (2013.01); *G07C 9/00571* (2013.01); *H04N 21/4131* (2013.01);
   (Continued)

(58) Field of Classification Search
   CPC ....... E05B 2047/0068; E05B 2047/069; E05B 2047/0094; E05B 2047/0094;
   (Continued)

(56) References Cited

U.S. PATENT DOCUMENTS 4,127,966 A    12/1978  Schmidt
4,386,436 A     5/1983  Kocher et al.
(Continued)

FOREIGN PATENT DOCUMENTS

CA    2 267 988 A1    4/1998
CN    105814555 A     7/2016
(Continued)

OTHER PUBLICATIONS

Mexican Institute of Industrial Property Office Action dated Nov. 1, 2013, for Mex. Patent Appln No. MX/a/2012/008882 is not translated into English, 3 pages.
(Continued)

*Primary Examiner* — Jennifer L Norton
(74) *Attorney, Agent, or Firm* — Kilpatrick Townsend & Stockton LLP

(57) ABSTRACT

Automation control for water leaks is provided. First sensor readings from first sensors disposed about water supply lines at a home to detect a first type of metrics indicative of water flow may be received and recorded over a first time period. Second sensor readings may be received from a second sensor. A first correlation between the first sensor readings and the second sensor readings may be identified. A first activity profile may be generated based on the first correlation. A first water use profile may be generated based on the first activity profile. First thresholds may be identified based on the first water use profile and may be retained in association with the first activity profile. Water use at the home may be monitored with the first sensors and activity at the home may be monitored with the second sensors. A water leak condition may be determined.

14 Claims, 11 Drawing Sheets

(51) Int. Cl.
*G05B 15/02* (2006.01)
*G07C 9/00* (2006.01)
*H04L 12/28* (2006.01)
*H04N 21/41* (2011.01)
*H04N 21/422* (2011.01)
*H04N 21/426* (2011.01)
*H04N 21/436* (2011.01)
*H04N 21/4363* (2011.01)
*H04N 21/472* (2011.01)
*H04N 21/478* (2011.01)
*H04N 21/61* (2011.01)

(52) U.S. Cl.
CPC ....... *H04N 21/422* (2013.01); *H04N 21/4263* (2013.01); *H04N 21/42202* (2013.01); *H04N 21/478* (2013.01); *H04N 21/47217* (2013.01); *H04N 21/6143* (2013.01); *E05B 2047/0068* (2013.01); *E05B 2047/0069* (2013.01); *E05B 2047/0094* (2013.01); *G05B 11/01* (2013.01); *G05B 15/02* (2013.01); *G05B 2219/2642* (2013.01); *G07C 2209/62* (2013.01); *H04L 12/2838* (2013.01); *H04N 21/43615* (2013.01); *H04N 21/43637* (2013.01); *Y10T 292/096* (2015.04)

(58) Field of Classification Search
CPC ................... G05B 11/01; G05B 15/02; G05B 2219/2642; G05D 7/0676; G07C 9/00571; G07C 2209/62; G10L 17/22; H04L 12/2803; H04L 12/2816; H04L 12/2825; H04L 12/2838; H04N 21/235; H04N 21/4126; H04N 21/4131; H04N 21/422; H04N 21/42202; H04N 21/4263; H04N 21/435; H04N 21/43615; H04N 21/43637; H04N 21/4532; H04N 21/454; H04N 21/47217; H04N 21/478; H04N 21/6143; Y10T 292/096
See application file for complete search history.

(56) References Cited

U.S. PATENT DOCUMENTS

| | | |
|---|---|---|
| 4,581,606 A | 4/1986 | Mallory |
| 4,694,607 A | 9/1987 | Ishida et al. |
| 4,728,949 A | 3/1988 | Platte et al. |
| 4,959,713 A | 9/1990 | Morotomi et al. |
| 5,400,246 A | 3/1995 | Wilson et al. |
| 5,770,896 A | 6/1998 | Nakajima |
| 5,805,442 A | 9/1998 | Crater et al. |
| 5,822,012 A | 10/1998 | Jeon et al. |
| 5,886,638 A | 3/1999 | Tanguay |
| 5,894,331 A | 4/1999 | Yang |
| 5,926,090 A | 7/1999 | Taylor et al. |
| 5,970,030 A | 10/1999 | Dimitri et al. |
| 6,081,758 A | 6/2000 | Parvulescu |
| 6,104,334 A | 8/2000 | Allport |
| 6,107,918 A | 8/2000 | Klein et al. |
| 6,107,935 A | 8/2000 | Comerford et al. |
| 6,119,088 A | 9/2000 | Ciluffo |
| 6,142,913 A | 11/2000 | Ewert |
| 6,182,094 B1 | 1/2001 | Humpleman et al. |
| 6,225,938 B1 | 5/2001 | Hayes et al. |
| 6,286,764 B1* | 9/2001 | Garvey ................ G05D 7/0635 236/12.12 |
| 6,330,621 B1 | 12/2001 | Bakke et al. |
| 6,337,899 B1 | 1/2002 | Alcendor et al. |
| 6,377,858 B1 | 4/2002 | Koeppe |
| 6,405,284 B1 | 6/2002 | Bridge |
| 6,415,257 B1 | 7/2002 | Jungua et al. |
| 6,502,166 B1 | 12/2002 | Cassidy |
| 6,529,230 B1 | 3/2003 | Chong |
| 6,543,051 B1 | 4/2003 | Manson et al. |
| 6,553,375 B1 | 4/2003 | Huang et al. |
| 6,663,375 B1 | 8/2003 | Huang et al. |
| 6,646,676 B1 | 11/2003 | DaGraca et al. |
| 6,662,282 B2 | 12/2003 | Cochran |
| 6,744,771 B1 | 6/2004 | Barber et al. |
| 6,748,343 B2 | 6/2004 | Alexander et al. |
| 6,751,657 B1 | 6/2004 | Zothner |
| 6,756,998 B1 | 6/2004 | Bilger |
| 6,876,889 B1 | 4/2005 | Lortz et al. |
| 6,891,838 B1 | 5/2005 | Petite et al. |
| 6,931,104 B1 | 8/2005 | Foster et al. |
| 6,976,187 B2 | 12/2005 | Arnott et al. |
| 6,989,731 B1 | 1/2006 | Kawai et al. |
| 7,009,528 B2 | 3/2006 | Griep |
| 7,010,332 B1 | 3/2006 | Irvin et al. |
| 7,088,238 B2 | 8/2006 | Karaoguz et al. |
| 7,103,545 B2 | 9/2006 | Furuta |
| 7,143,298 B2 | 11/2006 | Wells et al. |
| 7,216,002 B1 | 5/2007 | Anderson |
| 7,234,074 B2 | 6/2007 | Cohn et al. |
| 7,260,538 B2 | 8/2007 | Calderone et al. |
| 7,346,917 B2 | 3/2008 | Gatto et al. |
| 7,372,370 B2 | 5/2008 | Stults et al. |
| 7,386,666 B1 | 6/2008 | Beauchamp et al. |
| 7,391,319 B1 | 6/2008 | Walker |
| 7,395,369 B2 | 7/2008 | Sepez et al. |
| 7,395,546 B1 | 7/2008 | Asmussen |
| 7,529,677 B1 | 5/2009 | Wittenberg |
| 7,574,494 B1 | 8/2009 | Mayemick et al. |
| 7,579,945 B1 | 8/2009 | Richter et al. |
| 7,590,703 B2 | 9/2009 | Cashman et al. |
| 7,640,351 B2 | 12/2009 | Reckamp et al. |
| 7,659,814 B2 | 2/2010 | Chen et al. |
| 7,694,005 B2 | 4/2010 | Reckamp et al. |
| 7,739,718 B1 | 6/2010 | Young et al. |
| 7,861,034 B2 | 12/2010 | Yamamoto et al. |
| 7,870,232 B2 | 1/2011 | Reckamp et al. |
| 7,945,297 B2 | 5/2011 | Philipp |
| 7,969,318 B2 | 6/2011 | White et al. |
| 8,013,730 B2 | 9/2011 | Oh et al. |
| 8,042,048 B2 | 10/2011 | Wilson et al. |
| 8,086,757 B2 | 12/2011 | Chang |
| 8,106,768 B2 | 1/2012 | Neumann |
| 8,156,368 B2 | 4/2012 | Chambliss et al. |
| 8,171,148 B2 | 4/2012 | Lucas et al. |
| 8,180,735 B2 | 5/2012 | Ansari et al. |
| 8,201,261 B2 | 6/2012 | Barfield et al. |
| 8,221,290 B2 | 7/2012 | Vincent et al. |
| 8,275,143 B2 | 9/2012 | Johnson |
| 8,289,157 B2 | 10/2012 | Patenaude et al. |
| 8,290,545 B2 | 10/2012 | Terlizzi |
| 8,310,335 B2 | 11/2012 | Sivakkolundhu |
| 8,316,413 B2 | 11/2012 | Crabtree |
| 8,320,578 B2 | 11/2012 | Kahn et al. |
| 8,335,312 B2 | 12/2012 | Gerhardt et al. |
| 8,350,694 B1 | 1/2013 | Trundle et al. |
| 8,413,204 B2 | 4/2013 | White et al. |
| 8,436,902 B2 | 5/2013 | Kuehnle |
| 8,498,572 B1 | 7/2013 | Schooley et al. |
| 8,516,087 B2 | 8/2013 | Wilson et al. |
| 8,539,567 B1 | 9/2013 | Logue et al. |
| 8,550,368 B2 | 10/2013 | Butler et al. |
| 8,619,136 B2 | 12/2013 | Howarter et al. |
| 8,620,841 B1 | 12/2013 | Filson et al. |
| 8,644,525 B2 | 2/2014 | Bathurst et al. |
| 8,645,327 B2 | 2/2014 | Falkenburg et al. |
| 8,667,529 B2 | 3/2014 | Taxier |
| 8,750,576 B2 | 6/2014 | Huang et al. |
| 8,780,201 B1 | 7/2014 | Scalisi et al. |
| 8,781,508 B1 | 7/2014 | Blakely |
| 8,786,698 B2 | 7/2014 | Chen et al. |
| 8,799,413 B2 | 8/2014 | Taylor et al. |
| 8,818,898 B2 | 8/2014 | Schlossberg et al. |
| 8,898,709 B2 | 11/2014 | Crabtree |
| 8,923,823 B1 | 12/2014 | Wilde |
| 8,930,700 B2 | 1/2015 | Wielopolski |
| 8,948,793 B1 | 2/2015 | Birkhold et al. |
| 8,965,170 B1 | 2/2015 | Benea et al. |

(56) References Cited

U.S. PATENT DOCUMENTS

| | | |
|---|---|---|
| 9,019,111 B1 | 4/2015 | Sloo et al. |
| 9,049,567 B2 | 6/2015 | Le Guen et al. |
| 9,191,804 B1 | 11/2015 | Paczkowski et al. |
| 9,246,921 B1 | 1/2016 | Vlaminck et al. |
| 9,258,593 B1 | 2/2016 | Chen et al. |
| 9,353,500 B1 | 5/2016 | Andreski |
| 9,443,142 B2 | 9/2016 | Reynolds, Jr. |
| 9,462,041 B1 | 10/2016 | Hagins et al. |
| 9,495,860 B2 | 11/2016 | Lett |
| 9,511,259 B2 | 12/2016 | Mountain |
| 9,599,981 B2 | 3/2017 | Crabtree |
| 9,621,959 B2 | 4/2017 | Mountain |
| 9,628,286 B1 | 4/2017 | Nguyen et al. |
| 9,632,746 B2 | 4/2017 | Keipert et al. |
| 9,633,186 B2 | 4/2017 | Ingrassia, Jr. et al. |
| 9,729,989 B2 | 8/2017 | Marten |
| 9,769,522 B2 | 9/2017 | Richardson |
| 2001/0012998 A1 | 8/2001 | Jouet et al. |
| 2002/0003493 A1 | 1/2002 | Durst et al. |
| 2002/0019725 A1 | 2/2002 | Petite |
| 2002/0063633 A1 | 5/2002 | Park |
| 2002/0080238 A1 | 6/2002 | Ohmura |
| 2002/0193989 A1 | 12/2002 | Geilhufe et al. |
| 2003/0005431 A1 | 1/2003 | Shinohara |
| 2003/0052789 A1 | 3/2003 | Colmenarez et al. |
| 2003/0097452 A1 | 5/2003 | Kim et al. |
| 2003/0126593 A1 | 7/2003 | Mault |
| 2003/0133551 A1 | 7/2003 | Kahn |
| 2003/0140352 A1 | 7/2003 | Kim |
| 2003/0192600 A1* | 10/2003 | Ford ............... E03B 7/071 137/624.12 |
| 2003/0201900 A1 | 10/2003 | Bachinski et al. |
| 2004/0019489 A1 | 1/2004 | Funk et al. |
| 2004/0036579 A1 | 2/2004 | Megerle |
| 2004/0117038 A1 | 6/2004 | Karaoguz et al. |
| 2004/0117843 A1 | 6/2004 | Karaoguz et al. |
| 2004/0121725 A1 | 6/2004 | Matsui |
| 2004/0128034 A1 | 7/2004 | Lenker et al. |
| 2004/0143838 A1 | 7/2004 | Rose |
| 2004/0148419 A1 | 7/2004 | Chen et al. |
| 2004/0148632 A1 | 7/2004 | Park et al. |
| 2004/0260407 A1 | 12/2004 | Wimsatt |
| 2004/0266419 A1 | 12/2004 | Arling et al. |
| 2005/0038875 A1 | 2/2005 | Park |
| 2005/0049862 A1 | 3/2005 | Choi et al. |
| 2005/0106267 A1 | 5/2005 | Frykman et al. |
| 2005/0159823 A1 | 7/2005 | Hayes et al. |
| 2005/0188315 A1 | 8/2005 | Campbell et al. |
| 2005/0200478 A1 | 9/2005 | Koch et al. |
| 2005/0245292 A1 | 11/2005 | Bennett et al. |
| 2005/0252622 A1 | 11/2005 | Reid |
| 2005/0264698 A1 | 12/2005 | Eshleman |
| 2005/0289614 A1 | 12/2005 | Baek et al. |
| 2006/0011145 A1 | 1/2006 | Kates |
| 2006/0059977 A1 | 3/2006 | Kates |
| 2006/0087428 A1 | 4/2006 | Wolfe et al. |
| 2006/0136968 A1 | 6/2006 | Han et al. |
| 2006/0143679 A1 | 6/2006 | Yamada et al. |
| 2006/0155389 A1 | 7/2006 | Pessolano et al. |
| 2006/0192680 A1 | 8/2006 | Scuka et al. |
| 2006/0244624 A1 | 11/2006 | Wang et al. |
| 2006/0253894 A1 | 11/2006 | Bookman et al. |
| 2007/0044119 A1 | 2/2007 | Sullivan et al. |
| 2007/0078910 A1 | 4/2007 | Bopardikar |
| 2007/0129220 A1 | 6/2007 | Bardha |
| 2007/0135225 A1 | 6/2007 | Nieminen et al. |
| 2007/0142022 A1 | 6/2007 | Madonna et al. |
| 2007/0146545 A1 | 6/2007 | Iwahashi |
| 2007/0150460 A1 | 6/2007 | Evans |
| 2007/0157258 A1 | 7/2007 | Jung et al. |
| 2007/0192486 A1 | 8/2007 | Wilson et al. |
| 2007/0194922 A1 | 8/2007 | Nathan et al. |
| 2007/0256085 A1 | 11/2007 | Reckamp et al. |
| 2007/0271518 A1 | 11/2007 | Tischer et al. |
| 2007/0275670 A1 | 11/2007 | Chen et al. |
| 2007/0279244 A1 | 12/2007 | Haughawout et al. |
| 2007/0280504 A1 | 12/2007 | Badawy et al. |
| 2008/0019392 A1 | 1/2008 | Lee |
| 2008/0021971 A1 | 1/2008 | Halgas |
| 2008/0022322 A1 | 1/2008 | Grannan et al. |
| 2008/0046930 A1 | 2/2008 | Smith et al. |
| 2008/0062258 A1 | 3/2008 | Bentkovski et al. |
| 2008/0062965 A1 | 3/2008 | Silva et al. |
| 2008/0092199 A1 | 4/2008 | McCarthy et al. |
| 2008/0109095 A1 | 5/2008 | Braithwaite et al. |
| 2008/0114963 A1 | 5/2008 | Cannon et al. |
| 2008/0120639 A1 | 5/2008 | Walter et al. |
| 2008/0123825 A1 | 5/2008 | Abramson et al. |
| 2008/0140736 A1 | 6/2008 | Jarno |
| 2008/0144884 A1 | 6/2008 | Habibi |
| 2008/0163330 A1 | 7/2008 | Sparrell |
| 2008/0236214 A1 | 10/2008 | Han |
| 2008/0278635 A1 | 11/2008 | Hardacker et al. |
| 2008/0284905 A1 | 11/2008 | Chuang |
| 2008/0288876 A1 | 11/2008 | Fleming |
| 2008/0297660 A1 | 12/2008 | Shioya |
| 2009/0023554 A1 | 1/2009 | Shim |
| 2009/0027225 A1 | 1/2009 | Farley |
| 2009/0033505 A1 | 2/2009 | Jones et al. |
| 2009/0040013 A1 | 2/2009 | Ebrom et al. |
| 2009/0066320 A1 | 3/2009 | Posey |
| 2009/0069038 A1 | 3/2009 | Olague et al. |
| 2009/0083374 A1 | 3/2009 | Saint Clair |
| 2009/0112541 A1 | 4/2009 | Anderson et al. |
| 2009/0138507 A1 | 5/2009 | Burckart et al. |
| 2009/0146834 A1 | 6/2009 | Huang |
| 2009/0165069 A1 | 6/2009 | Kirchner |
| 2009/0167555 A1 | 7/2009 | Kohanek |
| 2009/0190040 A1 | 7/2009 | Watanabe et al. |
| 2009/0235992 A1* | 9/2009 | Armstrong .......... G01M 3/2807 137/487.5 |
| 2009/0249428 A1 | 10/2009 | White et al. |
| 2009/0270065 A1 | 10/2009 | Hamada et al. |
| 2009/0271203 A1 | 10/2009 | Resch et al. |
| 2009/0286654 A1 | 11/2009 | Rice |
| 2009/0307715 A1 | 12/2009 | Santamaria et al. |
| 2010/0031286 A1 | 2/2010 | Gupta et al. |
| 2010/0045471 A1* | 2/2010 | Meyers ................. G01M 3/18 340/605 |
| 2010/0046918 A1 | 2/2010 | Takao et al. |
| 2010/0083371 A1 | 4/2010 | Bennetts et al. |
| 2010/0097225 A1 | 4/2010 | Petricoin, Jr. |
| 2010/0102082 A1 | 4/2010 | Ebrom et al. |
| 2010/0122284 A1 | 5/2010 | Yoon et al. |
| 2010/0131280 A1 | 5/2010 | Bogineni |
| 2010/0138007 A1 | 6/2010 | Clark et al. |
| 2010/0138858 A1 | 6/2010 | Velazquez et al. |
| 2010/0146445 A1 | 6/2010 | Kraut |
| 2010/0161082 A1 | 6/2010 | Ebrom et al. |
| 2010/0164732 A1 | 7/2010 | Wedig et al. |
| 2010/0211546 A1 | 8/2010 | Grohman et al. |
| 2010/0277300 A1 | 11/2010 | Cohn et al. |
| 2010/0283579 A1 | 11/2010 | Kraus et al. |
| 2010/0309004 A1 | 12/2010 | Grundler et al. |
| 2010/0321151 A1 | 12/2010 | Matsuura et al. |
| 2011/0003665 A1 | 1/2011 | Burton et al. |
| 2011/0018693 A1 | 1/2011 | Lim et al. |
| 2011/0030016 A1 | 2/2011 | Pino et al. |
| 2011/0032423 A1 | 2/2011 | Jing et al. |
| 2011/0093126 A1 | 4/2011 | Toba et al. |
| 2011/0119325 A1 | 5/2011 | Paul et al. |
| 2011/0139076 A1 | 6/2011 | Pu et al. |
| 2011/0140832 A1 | 6/2011 | Vinkenvleugel et al. |
| 2011/0150432 A1 | 6/2011 | Paul et al. |
| 2011/0156862 A1 | 6/2011 | Langer |
| 2011/0157468 A1 | 6/2011 | Dai |
| 2011/0167250 A1 | 7/2011 | Dicks et al. |
| 2011/0187928 A1 | 8/2011 | Crabtree |
| 2011/0187930 A1 | 8/2011 | Crabtree |
| 2011/0187931 A1 | 8/2011 | Kim |
| 2011/0202956 A1 | 8/2011 | Connelly et al. |
| 2011/0267180 A1 | 11/2011 | Ferringo et al. |
| 2011/0270549 A1 | 11/2011 | Jeansonne et al. |
| 2011/0282837 A1 | 11/2011 | Gounares et al. |

(56) References Cited

U.S. PATENT DOCUMENTS

| | | |
|---|---|---|
| 2011/0283311 A1 | 11/2011 | Luong |
| 2011/0285528 A1 | 11/2011 | Weinstein et al. |
| 2011/0295396 A1 | 12/2011 | Chinen et al. |
| 2011/0296463 A1 | 12/2011 | Suslov |
| 2012/0019388 A1 | 1/2012 | Kates et al. |
| 2012/0047083 A1 | 2/2012 | Qiao et al. |
| 2012/0047532 A1 | 2/2012 | McCarthy |
| 2012/0059495 A1 | 3/2012 | Weiss et al. |
| 2012/0069246 A1 | 3/2012 | Thornberry et al. |
| 2012/0092183 A1 | 4/2012 | Corbett et al. |
| 2012/0094696 A1 | 4/2012 | Ahn et al. |
| 2012/0105724 A1 | 5/2012 | Candelore |
| 2012/0124245 A1 | 5/2012 | Reeves et al. |
| 2012/0124456 A1 | 5/2012 | Perez et al. |
| 2012/0154108 A1 | 6/2012 | Sugaya |
| 2012/0154138 A1 | 6/2012 | Cohn et al. |
| 2012/0164975 A1 | 6/2012 | Dodeja et al. |
| 2012/0167646 A1 | 7/2012 | Sharma et al. |
| 2012/0226366 A1 | 9/2012 | Lee et al. |
| 2012/0226768 A1 | 9/2012 | Gaines et al. |
| 2012/0271472 A1 | 10/2012 | Brunner et al. |
| 2012/0271670 A1 | 10/2012 | Zaloom |
| 2012/0280802 A1 | 11/2012 | Yoshida et al. |
| 2012/0291068 A1 | 11/2012 | Khushoo et al. |
| 2012/0314713 A1 | 12/2012 | Singh et al. |
| 2012/0316876 A1 | 12/2012 | Jang et al. |
| 2012/0326835 A1 | 12/2012 | Cockrell et al. |
| 2013/0006400 A1 | 1/2013 | Caceres et al. |
| 2013/0013106 A1 | 1/2013 | Carelli et al. |
| 2013/0031037 A1 | 1/2013 | Brandt et al. |
| 2013/0046800 A1 | 2/2013 | Assi et al. |
| 2013/0049950 A1 | 2/2013 | Wohlert |
| 2013/0053063 A1 | 2/2013 | McSheffrey |
| 2013/0060358 A1 | 3/2013 | Li et al. |
| 2013/0070044 A1 | 3/2013 | Naidoo et al. |
| 2013/0074061 A1 | 3/2013 | Averbuch et al. |
| 2013/0090213 A1 | 4/2013 | Amini et al. |
| 2013/0120137 A1 | 5/2013 | Lehmann |
| 2013/0124192 A1 | 5/2013 | Lindmark et al. |
| 2013/0138757 A1 | 5/2013 | Ferron |
| 2013/0147604 A1 | 6/2013 | Jones et al. |
| 2013/0152139 A1 | 6/2013 | Davis et al. |
| 2013/0158717 A1 | 6/2013 | Zywicki et al. |
| 2013/0179926 A1 | 7/2013 | White et al. |
| 2013/0185750 A1 | 7/2013 | Ayoub |
| 2013/0204408 A1 | 8/2013 | Thiruvengada et al. |
| 2013/0219482 A1 | 8/2013 | Brandt |
| 2013/0238326 A1 | 9/2013 | Kim et al. |
| 2013/0247117 A1 | 9/2013 | Yamada et al. |
| 2013/0267383 A1 | 10/2013 | Watterson |
| 2013/0278828 A1 | 10/2013 | Todd |
| 2013/0289788 A1 | 10/2013 | Gupta et al. |
| 2013/0300576 A1 | 11/2013 | Sinsuan et al. |
| 2013/0318559 A1 | 11/2013 | Crabtree |
| 2013/0321637 A1 | 12/2013 | Frank et al. |
| 2013/0324247 A1 | 12/2013 | Esaki et al. |
| 2013/0325150 A1 | 12/2013 | Bury |
| 2014/0025798 A1 | 1/2014 | Apte et al. |
| 2014/0028546 A1 | 1/2014 | Jeon et al. |
| 2014/0070959 A1 | 3/2014 | Bhargava et al. |
| 2014/0089671 A1 | 3/2014 | Logue et al. |
| 2014/0095684 A1 | 4/2014 | Nonaka et al. |
| 2014/0101465 A1 | 4/2014 | Wang et al. |
| 2014/0135993 A1 | 5/2014 | Kang et al. |
| 2014/0142724 A1 | 5/2014 | Park et al. |
| 2014/0160360 A1 | 6/2014 | Hsu et al. |
| 2014/0167969 A1 | 6/2014 | Wedig et al. |
| 2014/0168277 A1 | 6/2014 | Ashley et al. |
| 2014/0192197 A1 | 7/2014 | Hanko et al. |
| 2014/0192997 A1 | 7/2014 | Niu et al. |
| 2014/0201315 A1 | 7/2014 | Jacob et al. |
| 2014/0215505 A1 | 7/2014 | Balasubramanian et al. |
| 2014/0217905 A1 | 8/2014 | Clayton et al. |
| 2014/0218517 A1 | 8/2014 | Kim et al. |
| 2014/0222634 A1 | 8/2014 | Gordon et al. |
| 2014/0223548 A1 | 8/2014 | Wassingbo |
| 2014/0266669 A1 | 9/2014 | Fadell et al. |
| 2014/0266684 A1 | 9/2014 | Poder et al. |
| 2014/0282653 A1 | 9/2014 | Ariantaj et al. |
| 2014/0310075 A1 | 10/2014 | Ricci |
| 2014/0313014 A1 | 10/2014 | Huh et al. |
| 2014/0333529 A1 | 11/2014 | Kim et al. |
| 2014/0351832 A1 | 11/2014 | Cho et al. |
| 2014/0362201 A1 | 12/2014 | Nguyen et al. |
| 2014/0373074 A1 | 12/2014 | Hwang et al. |
| 2015/0008846 A1 | 1/2015 | Chen et al. |
| 2015/0015401 A1 | 1/2015 | Wedig et al. |
| 2015/0029096 A1 | 1/2015 | Ishihara |
| 2015/0054910 A1 | 2/2015 | Offen et al. |
| 2015/0061859 A1 | 3/2015 | Matsuoka et al. |
| 2015/0066173 A1 | 3/2015 | Ellis et al. |
| 2015/0074259 A1 | 3/2015 | Ansari et al. |
| 2015/0082225 A1 | 3/2015 | Shearer |
| 2015/0084770 A1 | 3/2015 | Xiao et al. |
| 2015/0085184 A1 | 3/2015 | Vidal et al. |
| 2015/0097689 A1 | 4/2015 | Logue et al. |
| 2015/0100167 A1 | 4/2015 | Sloo et al. |
| 2015/0105880 A1* | 4/2015 | Slupik ................ H04L 12/2816 700/90 |
| 2015/0106866 A1 | 4/2015 | Fujita |
| 2015/0113571 A1 | 4/2015 | Cholas et al. |
| 2015/0116113 A1 | 4/2015 | Caine et al. |
| 2015/0127712 A1 | 5/2015 | Fadell et al. |
| 2015/0131500 A1 | 5/2015 | Xie et al. |
| 2015/0137967 A1 | 5/2015 | Wedig et al. |
| 2015/0142991 A1 | 5/2015 | Zaloom |
| 2015/0143406 A1 | 5/2015 | Cho et al. |
| 2015/0143408 A1 | 5/2015 | Sallas |
| 2015/0145643 A1 | 5/2015 | Fadell et al. |
| 2015/0154850 A1 | 6/2015 | Fadell et al. |
| 2015/0156030 A1 | 6/2015 | Fadell et al. |
| 2015/0156612 A1 | 6/2015 | Vemulapalli |
| 2015/0159401 A1 | 6/2015 | Patrick et al. |
| 2015/0160623 A1 | 6/2015 | Holley |
| 2015/0160634 A1 | 6/2015 | Smith et al. |
| 2015/0160635 A1 | 6/2015 | Schofield et al. |
| 2015/0160636 A1 | 6/2015 | McCarthy et al. |
| 2015/0160935 A1 | 6/2015 | Nye |
| 2015/0161452 A1 | 6/2015 | McCarthy et al. |
| 2015/0161882 A1 | 6/2015 | Lett |
| 2015/0162006 A1 | 6/2015 | Kummer |
| 2015/0163411 A1 | 6/2015 | McCarthy, III et al. |
| 2015/0163412 A1 | 6/2015 | Holley et al. |
| 2015/0163535 A1 | 6/2015 | McCarthy et al. |
| 2015/0172742 A1 | 6/2015 | Richardson |
| 2015/0180708 A1 | 6/2015 | Jacob et al. |
| 2015/0192914 A1 | 7/2015 | Slupik |
| 2015/0198941 A1 | 7/2015 | Pederson |
| 2015/0241860 A1 | 8/2015 | Raid |
| 2015/0260424 A1 | 9/2015 | Fadell et al. |
| 2015/0281824 A1 | 10/2015 | Nguyen et al. |
| 2015/0309487 A1 | 10/2015 | Lyman |
| 2015/0325096 A1 | 11/2015 | Hatch |
| 2015/0334069 A1 | 11/2015 | Winston et al. |
| 2015/0341599 A1 | 11/2015 | Carey |
| 2015/0347910 A1 | 12/2015 | Fadell et al. |
| 2015/0365787 A1 | 12/2015 | Farrell |
| 2016/0029153 A1 | 1/2016 | Linn et al. |
| 2016/0041565 A1* | 2/2016 | Edwards .................. E03C 1/00 700/282 |
| 2016/0047569 A1 | 2/2016 | Fadell et al. |
| 2016/0063854 A1 | 3/2016 | Burton et al. |
| 2016/0066046 A1 | 3/2016 | Mountain |
| 2016/0091471 A1 | 3/2016 | Benn |
| 2016/0098309 A1 | 4/2016 | Kim |
| 2016/0100696 A1 | 4/2016 | Palashewski et al. |
| 2016/0109864 A1 | 4/2016 | Lonn |
| 2016/0121161 A1 | 5/2016 | Mountain |
| 2016/0123741 A1 | 5/2016 | Mountain |
| 2016/0163168 A1 | 6/2016 | Brav et al. |
| 2016/0182249 A1 | 6/2016 | Lea |
| 2016/0189527 A1 | 6/2016 | Peterson et al. |
| 2016/0191912 A1 | 6/2016 | Lea et al. |
| 2016/0191990 A1 | 6/2016 | McCarthy |

(56) References Cited

U.S. PATENT DOCUMENTS

| | | | |
|---|---|---|---|
| 2016/0196731 A1 | 7/2016 | Aich et al. |
| 2016/0203700 A1 | 7/2016 | Bruhn et al. |
| 2016/0234034 A1 | 8/2016 | Mahar et al. |
| 2016/0256485 A1 | 9/2016 | Wager et al. |
| 2016/0260135 A1 | 9/2016 | Zomet et al. |
| 2016/0285644 A1 | 9/2016 | Lu et al. |
| 2016/0286327 A1 | 9/2016 | Marten |
| 2016/0323548 A1 | 11/2016 | Khot et al. |
| 2016/0334811 A1 | 11/2016 | Marten |
| 2016/0335423 A1 | 11/2016 | Beals |
| 2016/0338179 A1 | 11/2016 | Aliakseyeu et al. |
| 2016/0342379 A1 | 11/2016 | Keipert et al. |
| 2016/0366746 A1 | 12/2016 | van de Ven et al. |
| 2017/0005822 A1 | 1/2017 | Gao |
| 2017/0065433 A1 | 1/2017 | Gould et al. |
| 2017/0041886 A1 | 2/2017 | Baker et al. |
| 2017/0048476 A1 | 2/2017 | Freiin von Kapri et al. |
| 2017/0051925 A1 | 2/2017 | Stefanski et al. |
| 2017/0054615 A1 | 2/2017 | Wilson |
| 2017/0082987 A1 | 3/2017 | Reddy et al. |
| 2017/0127124 A9 | 5/2017 | Wilson et al. |
| 2017/0146964 A1 | 5/2017 | Beals |
| 2017/0168469 A1 | 6/2017 | Marten et al. |
| 2017/0176961 A1 | 6/2017 | Tirpak |
| 2017/0187993 A1 | 6/2017 | Martch et al. |
| 2017/0191693 A1 | 7/2017 | Bruhn et al. |
| 2017/0191695 A1 | 7/2017 | Bruhn et al. |
| 2017/0195130 A1 | 7/2017 | Landow et al. |

FOREIGN PATENT DOCUMENTS

| | | |
|---|---|---|
| EP | 2 736 027 A1 | 5/2014 |
| EP | 3 080 677 A1 | 10/2016 |
| EP | 3 080 710 A1 | 10/2016 |
| GB | 2 304 952 A | 3/1997 |
| JP | 2008148016 A | 6/2008 |
| WO | 93/20544 A1 | 10/1993 |
| WO | 2004/068386 A1 | 8/2004 |
| WO | 2011/095567 A1 | 8/2011 |
| WO | 2014/068556 A1 | 5/2014 |
| WO | 2015/179120 A1 | 11/2015 |
| WO | 2016/034880 A1 | 3/2016 |
| WO | 2016/066399 A1 | 5/2016 |
| WO | 2016/066442 A1 | 5/2016 |
| WO | 2016/182696 A1 | 11/2016 |
| WO | 2017/116533 A1 | 7/2017 |

OTHER PUBLICATIONS

Fong A.C.M. et al, "Indoor air quality control for asthma patients using smart home technology," Consumer Electronics (ISCE), 2011 IEEE 15th International Symposium on, IEEE, Jun. 14, 2011, pp. 18-19, XP032007803, DOI: 10.1109/ISCE.2011.5973774, ISBN: 978-1-61284-8433, Abstract and sections 3 and 4.
Shunfeng Cheng et al., "A Wireless Sensor System for Prognostics and Health Management," IEEE Sensors Journal, IEEE Service Center, New York, NY, US, vol. 10, No. 4, Apr. 1, 2010, pp. 856-862, XP011304455, ISSN: 1530-437X, Sections 2 and 3.
International Search Report and Written Opinion for PCT/EP2015/070286 dated Nov. 5, 2015, 13 pages.
International Search Report and Written Opinion for PCT/GB2015/052544 dated Nov. 6, 2015, 10 pages.
International Search Report and Written Opinion for PCT/GB2015/052457 dated Nov. 13, 2015, 11 pages.
International Search Report and Written Opinion for PCT/EP2015/073299 dated Jan. 4, 2016, 12 pages.
International Search Report and Written Opinion for PCT/EP2015/073936 dated Feb. 4, 2016, all pages.
International Search Report and Written Opinion for PCT/US2016/028126 dated Jun. 3, 2016, all pages.
International Preliminary Report on Patentability for PCT/US2014/055441 dated Jun. 14, 2016, 8 pages.
International Preliminary Report on Patentability for PCT/US2014/053876 dated Jun. 14, 2016, 7 pages.
International Preliminary Report on Patentability for PCT/US2014/055476 dated Jun. 14, 2016, 9 pages.
Office Action for EP14868928.4 dated Sep. 23, 2016, all pages.
Notification of Publication of European Application No. 162004220 as EP 3166308 dated May 10, 2017, 2 pages.
U.S. Appl. No. 14/567,765, filed Dec. 11, 2014, Notice of Allowance dated May 24, 2017, all pages.
U.S. Appl. No. 14/567,754, filed Dec. 11, 2014, Final Rejection dated May 26, 2017, all pages.
U.S. Appl. No. 14/567,770, filed Dec. 11, 2014, Final Rejection dated Jun. 1, 2017, all pages.
U.S. Appl. No. 14/476,377, filed Sep. 3, 2014, Notice of Allowance dated May 19, 2017, all pages.
U.S. Appl. No. 14/832,821, filed Aug. 21, 2015, Non-Final Rejection dated Apr. 24, 2017, all pages.
U.S. Appl. No. 14/981,501, filed Dec. 28, 2015, Preinterview first office action dated Apr. 20, 2017, all pages.
U.S. Appl. No. 14/709,791, filed May 12, 2015, Non Final Rejection dated May 31, 2017, all pages.
Supplementary European Search Report for EP 14868928 dated Jul. 7, 2017, 11 pages.
U.S. Appl. No. 15/289,395, filed Oct. 10, 2016 Non-Final Rejection dated Jun. 19, 2017, all pages.
U.S. Appl. No. 14/497,130, filed Sep. 25, 2014, Final Rejection dated Aug. 4, 2017, all pages.
U.S. Appl. No. 14/981,501, filed Dec. 28, 2015, First Action Interview—office action dated Jul. 19, 2017, all pages.
U.S. Appl. No. 14/567,502, filed Dec. 11, 2014, Final Rejection dated Aug. 7, 2017, all pages.
Notification of Publication of European Application No. 15763643.2 as EP 3189511 on Jul. 12, 2017, 1 page.
Supplementary European Search Report for EP 14870507 dated Jun. 28, 2017, all pages. (Received in KTS FIP in Sep. 2017, all refs from SR already cited).
"Plug-In Carbon Monoxide & Natural Gas Alarm with Backup Battery Protection," Universal Security Instruments, Inc. , 2011, 12 pages.
U.S. Appl. No. 14/584,075, filed Dec. 29, 2014, Final Rejection dated Sep. 9, 2017, all pages.
U.S. Appl. No. 14/952,580, filed Nov. 25, 2015, Non-Final Rejection dated Sep. 20, 2017, all pages.
U.S. Appl. No. 15/189,775, filed Jun. 22, 2016, Notice of Allowance dated Sep. 11, 2017, all pages.
U.S. Appl. No. 14/986,496, filed Dec. 31, 2015, Non-Final Rejection dated Sep. 26, 2017, all pages.
U.S. Appl. No. 14/710,331, filed May 12, 2015, Final Rejection dated Aug. 16, 2017, all pages.
U.S. Appl. No. 14/553,763, filed Nov. 25, 2014 Preinterview first office action dated Oct. 6, 2017, all pages.
Author Unknown, "Acoustic/Ultrasound Ultrasonic Flowmeter Basics," Questex Media Group LLC, accessed on Dec. 16, 2014, 4 pages. Retrieved from http://www.sensorsmag.com/sensors/acoustic-ultrasound/ultrasonic-flowmeter-basics-842.
International Search Report and Written Opinion for PCT/US2014/055476 dated Dec. 30, 2014, 10 pages.
International Preliminary Report on Patentability for PCT/EP2011/051608 dated Aug. 16, 2012, 8 pages.
U.S. Appl. No. 14/497,130, filed Sep. 25, 2014, Non Final Rejection dated Feb. 8, 2017, all pages.
International Search Report and Written Opinion of PCT/US2014/053876 dated Nov. 26, 2014, 8 pages.
International Search Report and Written Opinion of PCT/US2014/055441 dated Dec. 4, 2014, 10 pages.
U.S. Appl. No. 12/700,310, filed Feb. 4, 2010, Office Action dated May 4, 2012, 15 pages.
U.S. Appl. No. 12/700,310, filed Feb. 4, 2010, Final Office Action dated Oct. 10, 2012, 16 pages.
U.S. Appl. No. 12/700,310, filed Feb. 4, 2010, Non-Final Office Action dated Apr. 1, 2013, 16 pages.
U.S. Appl. No. 12/700,310, filed Feb. 4, 2010, Non-Final Office Action dated Oct. 15, 2013, 15 pages.

(56) References Cited

OTHER PUBLICATIONS

U.S. Appl. No. 12/700,310, filed Feb. 4, 2010, Final Office Action dated Feb. 28, 2014, 17 pages.
U.S. Appl. No. 12/700,310, filed Feb. 4, 2010, Non-Final Office Action dated Aug. 14, 2014, 18 pages.
U.S. Appl. No. 12/700,408, filed Feb. 4, 2010, Notice of Allowance dated Jul. 28, 2012, 8 pages.
U.S. Appl. No. 13/680,934, filed Nov. 19, 2012, Non-Final Office Action dated Oct. 2, 2013, 7 pages.
U.S. Appl. No. 13/680,934, filed Nov. 19, 2012, Final Office Action dated Feb. 10, 2014, 13 pages.
U.S. Appl. No. 13/680,934, filed Nov. 19, 2012, CongNotice of Allowance dated Apr. 30, 2014, 9 pages.
U.S. Appl. No. 13/680,934, filed Nov. 19, 2012, Notice of Allowance dated Jul. 25, 2014, 12 pages.
Wang et al., "Mixed Sound Event Verification on Wireless Sensor Network for Home Automation," IEEE Transactions on Industrial Informatics, vol. 10, No. 1, Feb. 2014, 10 pages.
International Search Report and Written Opinion for PCT/US2016/057729 dated Mar. 28, 2017, all pages.
European Search Report for EP 16 20 0422 dated Jan. 13, 2017, all pages.
Bdejong_Cree, "Cannot remove last user of a group even though members still exist," Microsoft Visual Studio forum site, Topic ID #58405, Response by Microsoft, Dec. 17, 2010) retrieved on Apr. 6, 2017 from: https://connect.microsoft.com/VisualStudio/feedback/details/580405/tfs-2010-cannont-remove-last-user-of-a-group-even-though-members-still-exists.
International Preliminary Report on Patentability for PCT/GB2015/052457 dated Feb. 28, 2017, all pages.
U.S. Appl. No. 14/567,765, filed Dec. 11, 2014, Final Rejection dated Feb. 16, 2017, all pages.
U.S. Appl. No. 14/584,075, filed Dec. 29, 2014, Non-Final Rejection dated Mar. 10, 2017, all pages.
U.S. Appl. No. 14/710,331, filed May 12, 2015, Non-Final Rejection dated Mar. 10, 2017, all pages.
U.S. Appl. No. 14/566,977, filed Dec. 11, 2014, Final Rejection dated Feb. 10, 2017, all pages.
U.S. Appl. No. 14/565,853 filed Dec. 10, 2014, Non Final Rejection dated Mar. 10, 2017, all pages.
International Preliminary Report on Patentability for PCT/GB2015/052544 dated Mar. 7, 2017, all pages.
U.S. Appl. No. 14/485,188, filed Sep. 12, 2014, Non-Final Rejection dated Apr. 19, 2017, all pages.
U.S. Appl. No. 14/671,299, filed Mar. 27, 2015, Notice of Allowance dated Apr. 17, 2017, all pages.
U.S. Appl. No. 15/075,412, filed Mar. 21, 2016, Final Rejection dated Apr. 17, 2017, all pages.
U.S. Appl. No. 14/528,402, filed Oct. 30, 2014, Non-Final Rejection dated Apr. 11, 2017, all pages.
U.S. Appl. No. 14/475,252, filed Sep. 2, 2014, Non-Final Rejection dated Apr. 12, 2017, all pages.
Author Unknown, "AllJoyn Onboarding Service Frameworks," Qualcomm Connected Experiences, Inc., accessed on Jul. 15, 2014, 9 pages. Retrieved from https://www.alljoyn.org.
Author Unknown, "App for Samsung Smart TV®," Crestron Electronics, Inc., accessed on Jul. 14, 2014, 3 pages. Retrieved from http://www.crestron.com/products/smart tv television apps/.
Author Unknown, "Do you want to know how to find water leaks? Use a Bravedo Water Alert Flow Monitor to find out!", Bravedo.com, accessed Dec. 16, 2014, 10 pages. Retrieved from http://bravedo.com/.
Author Unknown, "Flow Pulse®, Non-invasive clamp-on flow monitor for pipes," Pulsar Process Measurement Ltd, accessed on Dec. 16, 2014, 2 pages.Retrieved from http://www.pulsar-pm.com/product-types/flow/flow-pulse.aspx.
Author Unknown, "International Building Code Excerpts, Updated with recent code changes that impact electromagnetic locks," Securitron, Assa Abloy, 2007, 2009,2 pages.Retrieved from: www.securitron.com/Other/.../New_IBC-IFC_Code_Language.pdf.
Author Unknown, "Introduction to Ultrasonic Doppler Flowmeters," Omega Engineering inc., accessed on Dec. 16, 2014, 3 pages. Retrieved from http://www.omega.com/prodinfo/ultrasonicflowmeters.html.
Author Unknown, "Ultrasonic Flow Meters," RS Hydro Ltd, accessed on Dec. 16, 2014, 3 pages. Retrieved from http://www.rshydro.co.uk/ultrasonic-flowmeter.shtml.
Author Unknown, "Voice Activated TV using the Amulet Remote for Media Center," AmuletDevices.com, accessed on Jul. 14, 2014, 1 page. Retrieved from http://www.amuletdevices.com/index.php/Features/television.html.
Lamonica, M., "CES 2010 Preview: Green comes in many colors," retrieved from CNET.com (http://ces.cnet.com/8301-31045_1-10420381-269.html), Dec. 22, 2009, 2 pages.
Robbins, Gordon, Deputy Chief, "Addison Fire Department Access Control Installation," 2006 International Fire Code, Section 1008.1.3.4, 4 pages.

* cited by examiner

DETECTION AND MITIGATION OF WATER LEAKS WITH HOME AUTOMATION

CROSS-REFERENCE TO RELATED APPLICATION

This application claims the benefit of U.S. Provisional Patent Application No. 61/914,856 filed Dec. 11, 2013 and entitled "METHODS AND SYSTEMS FOR HOME AUTOMATION," the entirety of which is hereby incorporated by reference for all intents and purposes.

This application is related to U.S. patent application Ser. No. 14/485,188 entitled "HOME AUTOMATION SYSTEM INTEGRATION," filed Sep. 12, 2014, which is incorporated by reference for all purposes.

BACKGROUND

The present disclosure relates in general to home automation, and, more specifically, but not by way of limitation, to systems, methods, apparatus, and processor-readable media for facilitating detection and mitigation of water leaks with home automation.

Many home devices and user interactions with such devices have remained unchanged for decades. For instance, a water leak in a home is typically detected only when an individual physically views the water leak, oftentimes too late after there is significant water damage. In some instances, a water leak can continue for a long time. For example, a home could be empty for significant period of time as occupants are away at work, school, vacation, and the like. To stop the water leak, the individual typically must find the appropriate shutoff valve and manually close the valve. Many times, this is only done after an individual has returned home after being away for an extended period.

As value, use, and demand corresponding to home automation continue to increase, consumers have come to expect more flexible and useful features. Companies are expected to compete to provide more flexible product and service offerings. There is a need in the home automation space to provide enhanced water leak detection and control features.

BRIEF SUMMARY

The present disclosure relates in general to home automation, and, more specifically, but not by way of limitation, to systems, methods, apparatus, and processor-readable media for facilitating detection and mitigation of water leaks with home automation.

In one aspect, a method for automation control for water leaks is disclosed. The method may include one or a combination of the following, which may be performed by a control device. A first set of one or more sensor readings from a first set of one or more sensors disposed about one or more water supply lines at a home may be received. The first set of one or more sensors to detect a first type of one or more metrics may be indicative of water flow. The first set of one or more sensor readings may be recorded over a first time period. A second set of one or more sensor readings may be received from a second set of one or more sensors disposed at the home. A first correlation between the first set of one or more sensor readings over the first time period and the second set of one or more sensor readings may be identified. A first activity profile may be generated based at least in part on the first correlation. A first water use profile may be generated based at least in part on the first activity profile. A first set of one or more thresholds may be identified based at least in part on the first water use profile. The first set of one or more thresholds may be retained in association with the first activity profile. Water use at the home may be monitored at least in part with the first set of one or more sensors and activity at the home may be monitored at least in part with the second set of one or more sensors. A water leak condition may be determined based at least in part on the monitoring. The determining the water leak condition may include matching monitored activity to the first activity profile, comparing a third set of one or more sensor readings indicative of monitored water use to at least one threshold of the first set of one or more thresholds, and determining that the at least one threshold is satisfied.

In another aspect, a system for automation control for water leaks is disclosed. A control device may be communicatively coupled to: a first set of one or more sensors disposed about one or more water supply lines at a home, the first set of one or more sensors to detect a first type of one or more metrics indicative of water flow; and a second set of one or more sensors disposed at the home. The control device may include one or more processors and a memory communicatively coupled with and readable by the one or more processors and having stored therein processor-readable instructions which, when executed by the one or more processors, cause the one or more processors to perform one or a combination of the following. A first set of one or more sensor readings from the first set of one or more sensors may be received. The first set of one or more sensor readings may be recorded over a first time period. A second set of one or more sensor readings may be received from the second set of one or more sensors disposed at the home. A first correlation between the first set of one or more sensor readings over the first time period and the second set of one or more sensor readings may be identified. A first activity profile may be generated based at least in part on the first correlation. A first water use profile may be generated based at least in part on the first activity profile. A first set of one or more thresholds may be identified based at least in part on the first water use profile. The first set of one or more thresholds may be retained in association with the first activity profile. Water use at the home may be monitored at least in part with the first set of one or more sensors and activity at the home may be monitored at least in part with the second set of one or more sensors. A water leak condition may be determined based at least in part on the monitoring. The determining the water leak condition may include matching monitored activity to the first activity profile, comparing a third set of one or more sensor readings indicative of monitored water use to at least one threshold of the first set of one or more thresholds, and determining that the at least one threshold is satisfied.

In yet another aspect, one or more non-transitory, machine-readable media having machine-readable instructions thereon are disclosed. The machine-readable instructions, when executed by one or more processing devices, facilitates automation control for water leaks, causing the one or more processing devices to perform one or a combination of the following. A first set of one or more sensor readings from a first set of one or more sensors disposed about one or more water supply lines at a home may be received. The first set of one or more sensors to detect a first type of one or more metrics may be indicative of water flow. The first set of one or more sensor readings may be recorded over a first time period. A second set of one or more sensor readings may be received from a second set of one or more sensors disposed at the home. A first correlation between the first set of one or more sensor readings over the first time period and the second set of one or more sensor readings may be identified. A first activity profile may be generated based at least in part on the first correlation. A first water use profile may be generated based at least in part on the first activity profile. A first set of one or more thresholds may be identified based at least in part on the first water use profile. The first set of one or more thresholds may be retained in association with the first activity profile. Water use at the home may be monitored at least in part with the first set of one or more sensors and activity at the home may be monitored at least in part with the second set of one or more sensors. A water leak condition may be determined based at least in part on the monitoring. The determining the water leak condition may include matching monitored activity to the first activity profile, comparing a third set of one or more sensor readings indicative of monitored water use to at least one threshold of the first set of one or more thresholds, and determining that the at least one threshold is satisfied.

In some embodiments, transmission of a user notification to indicate the water leak condition via one or more notification interfaces may be caused. In some embodiments, an adjustment to address the water leak condition may be determined, and the water supply controller may be caused to make the adjustment. In some embodiments, one or more user selections corresponding to one or more user-selection options may be processed, and the causing the water supply controller to make the adjustment may be based in part on the one or more user selections.

In some embodiments, one or more user selections corresponding to one or more user-selection options may be processed, and the first set of one or more thresholds may be modified, based in part on the one or more user selections. In some embodiments, the second set of one or more sensor readings from the second set of one or more sensors may indicate one or more locations of one or more occupants of the home. In some embodiments, the second set of one or more sensor readings from the second set of one or more sensors may indicate one or more states of one or more water-supplied devices of the home.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
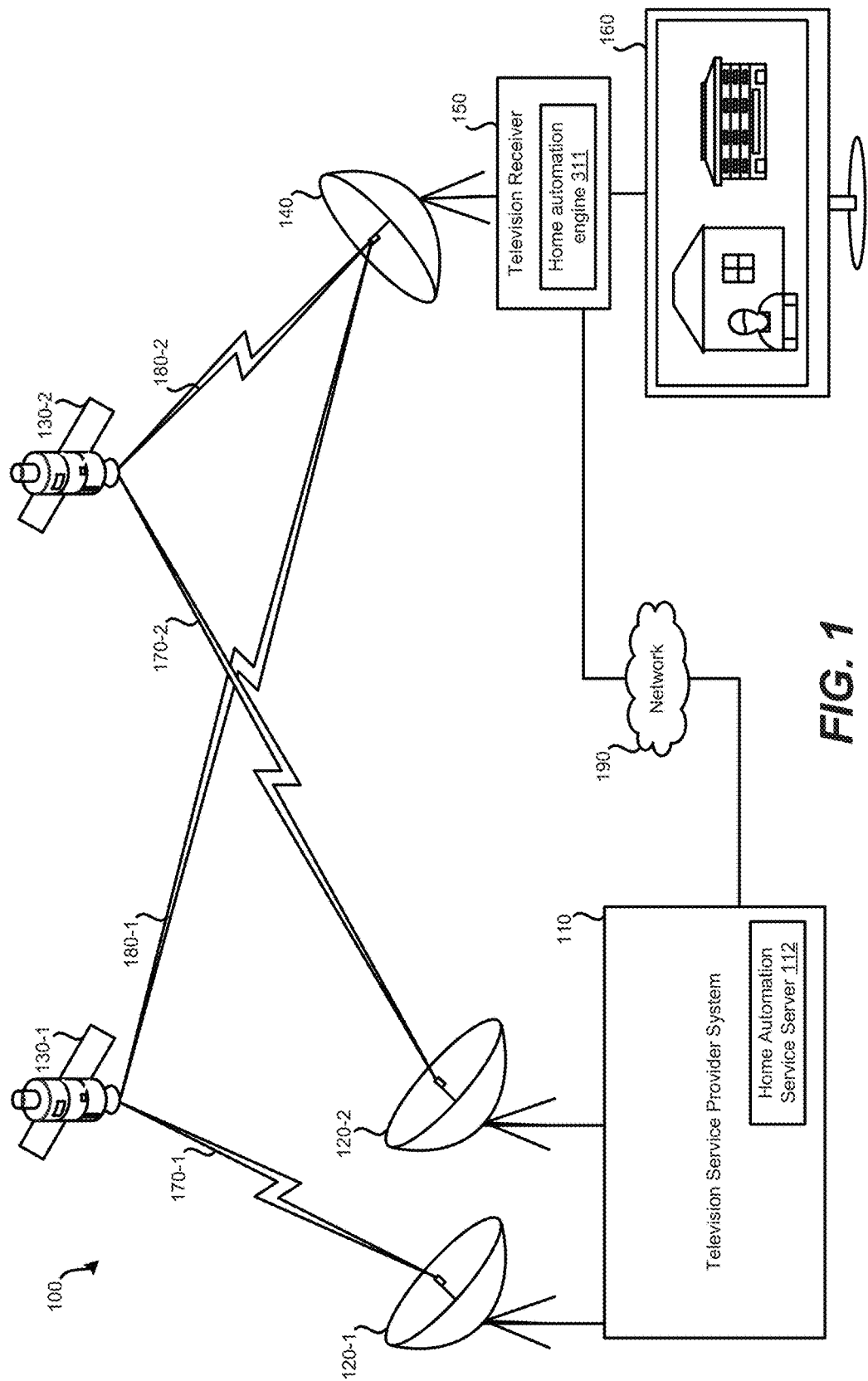
FIG. 1 illustrates an embodiment of a television service provider system, in accordance with certain embodiments of the present disclosure.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

The present disclosure is directed to systems, methods, apparatus, and processor-readable media for facilitating detection and mitigation of water leaks with home automation. In certain embodiments according to the present disclosure, a television receiver may serve as a host for a home automation system. By using a television receiver to host a home automation system, various advantages may be realized. For instance, the home automation system may be able to conveniently present home automation information to a user via a connected display device, such as a television or other connected devices, such as a tablet computer, mobile phone, monitor, or laptop computer. Further, since many people spend a considerable amount of time watching television, a television may be a convenient device via which to present home automation information to a user while the user is watching television. Further, a television receiver may be able to communicate with a television service provider.

Such a television service provider may be able to augment a home automation system with various services, such as the ability to monitor the home automation system for evidence of a water leak in the home's water system and appliances supplied with water from the water system. The water leak could occur in any number of places within or about the home, such as in plumbing pipes, in sprinkler systems, at toilets, sinks, appliances, and other water-based features connected to the home's water supply. A set of one or more leak detection sensors may be employed to detect a water leak. The set of one or more leak detection sensors may be in communication with television receiver or overlay device of the home automation system and may be used to determine when a water leak as occurred.

In certain embodiments, if a leak detection sensor determines that a leak may be occurring, a notification may be provided to a user via a wireless device and/or a display device. A user may be able to provide input to allow the flow of water to continue or to immediately interrupt the flow of water. Absent input by a user to clear the notification of a leak, the flow of water may be shut off by a water controller after a predefined period of time and/or when another threshold is satisfied (e.g., a water volume threshold).

In various embodiments, the home automation system may utilize various rules to determine whether a leak is occurring. The amount of water typically drawn by water-supplied devices may be known, if the flow rate and/or flow time significantly exceeds normal operating parameters, it may be determined that a leak is occurring. In some embodiments, the home automation system may communicate with appliances to determine whether water is flowing to the devices. In some embodiments, data from various motion sensors may be utilized. A determination of a leak condition may be based on intelligence about whether appliance(s) are using water and/or whether individual are present in the home (and, possibly, particular locations in the home).

Various embodiments will now be discussed in greater detail with reference to the accompanying figures, beginning with FIG. 1.

FIG. 1 illustrates an embodiment of a satellite television distribution system 100, in accordance with certain embodiments of the present disclosure. While a home automation system may be incorporated with various types of television receivers, various embodiments may be part of a satellite-based television distribution system. Cable, IP-based, wireless and broadcast focused systems are also possible. Satellite television distribution system 100 may include: television service provider system 110, satellite transmitter equipment 120, satellites 130, satellite dish 140, television receiver 150, system credit management engine 112, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions of) instances and types of user equipment may receive data and television signals from television service provider system 110 via satellites 130.

Television service provider system 110 and satellite transmitter equipment 120 may be operated by a television service provider. A television service provider may distribute television channels, on-demand programming, programming information, and/or other content/services to users. Television service provider system 110 may receive feeds of one or more television channels and content from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically, to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from downlink signals 180. Satellites 130 may be in geosynchronous orbit. Each of the transponder streams transmitted by satellites 130 may contain multiple television channels transmitted as packetized data. For example, a single transponder stream may be a serial digital packet stream containing multiple television channels. Therefore, packets for multiple television channels may be interspersed. Further, information used by television receiver 150 for home automation functions may be also be relayed to television receiver via one or more transponder streams.

Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 130-1. A third, fourth, and fifth television channel may be relayed via a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a subscriber for use on a subscription basis to receive television channels provided by the television service provider system 110, satellite transmitter equipment 120, and/or satellites 130. Satellite dish 140, which may include one or more low noise blocks (LNBs), may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a given time. The tuner can then be re-tuned to another transponder of the same or a different satellite. A television receiver 150 having multiple tuners may allow for multiple transponder streams to be received at the same time.

Figure 2:
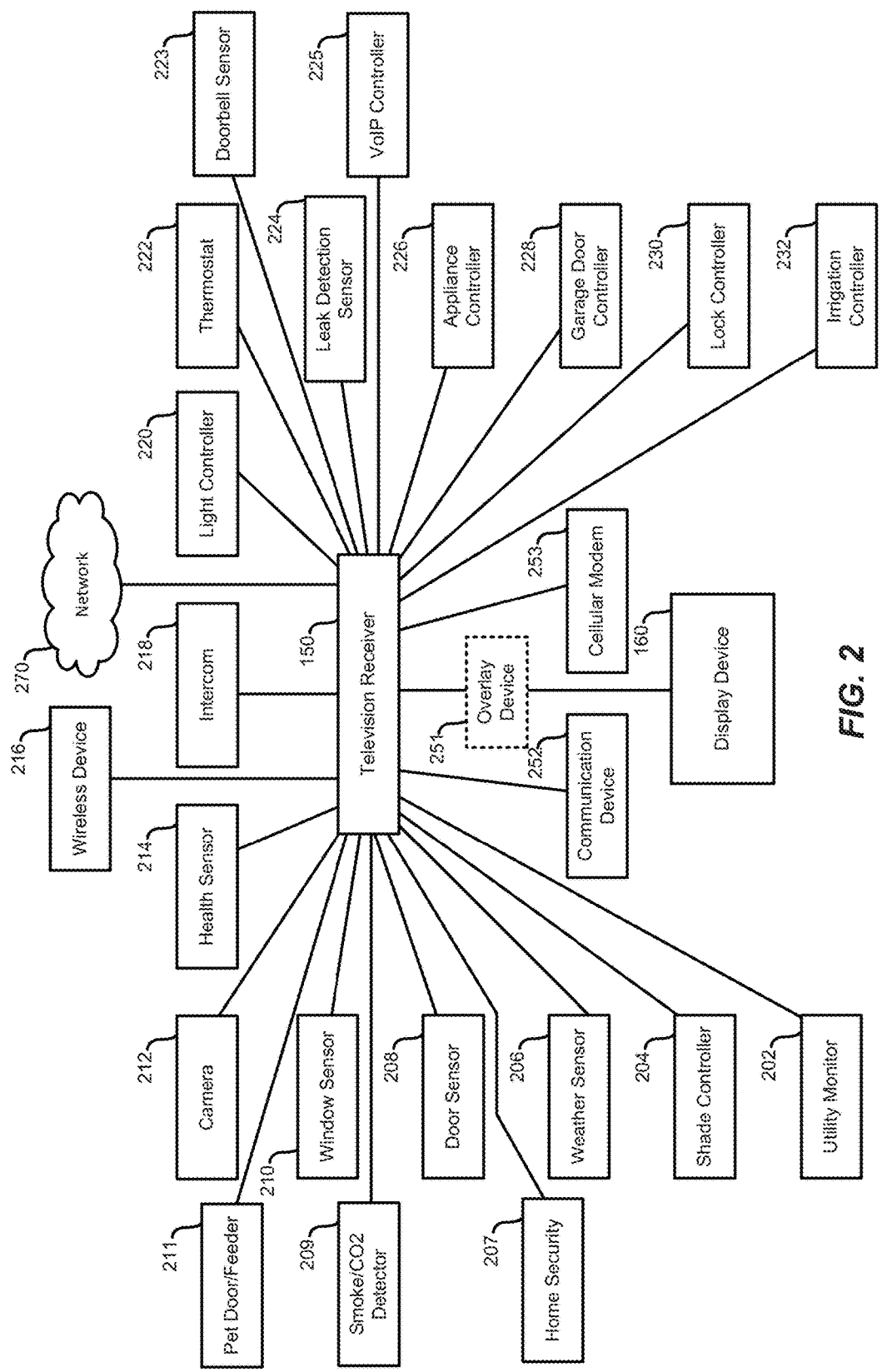
FIG. 2 illustrates an embodiment of a home automation system hosted by a television receiver, in accordance with certain embodiments of the present disclosure.

In communication with satellite dish 140 may be one or more television receivers. Television receivers may be configured to decode signals received from satellites 130 via satellite dish 140 for output and presentation via a display device, such as display device 160. A television receiver may be incorporated as part of a television or may be part of a separate device, commonly referred to as a set-top box (STB). Television receiver 150 may decode signals received via satellite dish 140 and provide an output to display device 160. On-demand content, such as PPV content, may be stored to a computer-readable storage medium. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 1 illustrates an embodiment of television receiver 150 as separate from display device 160, it should be understood that, in other embodiments, similar functions may be performed by a television receiver integrated with display device 160. Television receiver 150 may include home automation engine 311, as detailed in relation to FIG. 3.

Display device 160 may be used to present video and/or audio decoded and output by television receiver 150. Television receiver 150 may also output a display of one or more interfaces to display device 160, such as an electronic programming guide (EPG). In many embodiments, display device 160 is a television. Display device 160 may also be a monitor, computer, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a first group of television channels, while uplink signal 170-2 contains a second group of television channels. Each of these television channels may be scrambled such that unauthorized persons are prevented from accessing the television channels.

Downlink signal 180-1 represents a signal between satellite 130-1 and satellite dish 140. Downlink signal 180-2 represents a signal between satellite 130-2 and satellite dish 140. Each of downlink signals 180 may contain one or more different television channels, which may be at least partially scrambled. A downlink signal may be in the form of a transponder stream. A single transponder stream may be tuned to at a given time by a tuner of a television receiver. For example, downlink signal 180-1 may be a first transponder stream containing a first group of television channels, while downlink signal 180-2 may be a second transponder stream containing a different group of television channels. In addition to or instead of containing television channels, a transponder stream can be used to transmit on-demand content to television receivers, including PPV content (which may be stored locally by the television receiver until output for presentation).

FIG. 1 illustrates downlink signal 180-1 and downlink signal 180-2, being received by satellite dish 140 and distributed to television receiver 150. For a first group of television channels, satellite dish 140 may receive downlink signal 180-1 and for a second group of channels, downlink signal 180-2 may be received. Television receiver 150 may decode the received transponder streams. As such, depending on which television channels are desired to be presented or stored, various transponder streams from various satellites may be received, descrambled, and decoded by television receiver 150.

Network 190, which may include the Internet, may allow for bidirectional communication between television receiver 150 and television service provider system 110, such as for home automation related services provided by home automation service server 112. In addition or in alternate to network 190, a telephone (e.g., landline) or cellular connection may be used to enable communication between television receiver 150 and television service provider system 110.

FIG. 2 illustrates an embodiment of a home automation system 200 hosted by a television receiver, in accordance with certain embodiments of the present disclosure. Television receiver 150 may represent the television receiver of FIG. 1. While television receiver 150 may be configured to receive television programming from a satellite-based television service provider, it should be understood that in other embodiments, other forms of television service provider networks may be used, such as an IP-based network (e.g., fiber network), a cable based network, a wireless broadcast-based network, etc.

Television receiver 150 may be configured to communicate with multiple in-home home automation devices. The devices with which television receiver 150 communicates may use different communication standards. For instance, one or more devices may use a ZigBee® communication protocol while one or more other devices communicate with the television receiver using a Z-Wave® communication protocol. Other forms of wireless communication may be used by devices and the television receiver. For instance, television receiver 150 and one or more devices may be configured to communicate using a wireless local area network, which may use a communication protocol such as 802.11.

In some embodiments, a separate device may be connected with television receiver 150 to enable communication with home automation devices. For instance, communication device 252 may be attached to television receiver 150. Communication device 252 may be in the form of a dongle. Communication device 252 may be configured to allow for Zigbee®, Z-Wave®, and/or other forms of wireless communication. The communication device may connect with television receiver 150 via a USB port or via some other type of (wired) communication port. Communication device 252 may be powered by the television receiver or may be separately coupled with a power source. In some embodiments, television receiver 150 may be enabled to communicate with a local wireless network and may use communication device in order to communicate with devices that use a ZigBee® communication protocol, Z-Wave® communication protocol, and/or some other home wireless communication protocols.

Communication device 252 may also serve to allow additional components to be connected with television receiver 150. For instance, communication device 252 may include additional audio/video inputs (e.g., HDMI), component, and/or composite input to allow for additional devices (e.g., Blu-ray players) to be connected with television receiver 150. Such connection may allow video from such additional devices to be overlaid with home automation information. Whether home automation information is overlaid onto video may be triggered based on a user's press of a remote control button.

Regardless of whether television receiver 150 uses communication device 252 to communicate with home automation devices, television receiver 150 may be configured to output home automation information for presentation to a user via display device 160. Such information may be presented simultaneously with television programming received by television receiver 150, such as via system 100 of FIG. 1. Television receiver 150 may also, at a given time, output only television programming or only home automation information based on a user's preference. The user may be able to provide input to television receiver 150 to control the home automation system hosted by television receiver 150 or by overlay device 251, as detailed below.

In some embodiments, television receiver 150 may not be used as a host for a home automation system. Rather, a separate device may be coupled with television receiver 150 that allows for home automation information to be presented to a user via display device 160. This separate device may be coupled with television receiver 150. In some embodiments, the separate device is referred to as overlay device 251. Overlay device 251 may be configured to overlay information, such as home automation information, onto a signal to be visually presented via display device 160, such as a television. In some embodiments, overlay device 251 may be coupled between television receiver 150, which may be in the form of a set top box, and display device 160, which may be a television. In such embodiments, television receiver 150 may receive, decode, descramble, decrypt, store, and/or output television programming. Television receiver 150 may output a signal, such as in the form of an HDMI signal. Rather than be directly input to display device 160, the output of television receiver 150 may be input to overlay device 251. Overlay device 251 may receive the video and/or audio output from television receiver 150. Overlay device 251 may add additional information to the video and/or audio signal received from television receiver 150. The modified video and/or audio signal may be output to display device 160 for presentation. In some embodiments, overlay device 251 has an HDMI input and an HDMI output, with the HDMI output being connected to display device 160. To be clear, while FIG. 2 illustrates lines illustrating communication between television receiver 150 and various devices, it should be understood that such communication may exist, in addition or in alternate via communication device 252 and/or with overlay device 251.

Figure 4:
FIG. 4 illustrates an embodiment of a screenshot output to a display device by a television received configured to host a home automation system, in accordance with certain embodiments of the present disclosure.

In some embodiments, television receiver 150 may be used to provide home automation functionality but overlay device 251 may be used to present information via display device 160. It should be understood that the home automation functionality detailed herein in relation to a television receiver may alternatively be provided via overlay device 251. In some embodiments, overlay device 251 may provide home automation functionality and be used to present information via display device 160. Using overlay device 251 to present automation information via display device 160 may have additional benefits. For instance, multiple devices may provide input video to overlay device 251. For instance, television receiver 150 may provide television programming to overlay device 251, a DVD/Blu-Ray player may provide video overlay device 251, and a separate internet-TV device may stream other programming to overlay device 251. Regardless of the source of the video/audio, overlay device 251 may output video and/or audio that has been modified to include home automation information (e.g., as illustrated in FIG. 4) and output to display device 160. As such, in such embodiments, regardless of the source of video/audio, overlay device 251 may modify the audio/video to include home automation information and, possibly, solicit for user input. For instance, in some embodiments overlay device 251 may have four video inputs (e.g., four HDMI inputs) and a single video output (e.g., an HDMI output). In other embodiments, such overlay functionality may be part of television receiver 150. As such, a separate device, such as a Blu-ray player may be connected with a video input of television receiver 150, thus allowing television receiver 150 to overlay home automation information when content from the Blu-Ray player is being output to display device 160.

Regardless of whether television receiver 150 is itself configured to provide home automation functionality and output home automation input for display via display device 160 or such home automation functionality is provided via overlay device 251, home automation information may be presented by display device 160 while television programming is also being presented by display device 160. For instance, home automation information may be overlaid or may replace a portion of television programming (e.g., broadcast content, stored content, on-demand content, etc.) presented via display device 160. As an example, FIG. 4 illustrates an embodiment of a screenshot 400 output to a display device by a television received configured to host a home automation system. In FIG. 4, while television programming is being presented 402 (e.g., a television show on scuba diving), the display is augmented with information related to home automation 404. This television show 402 may represent broadcast programming, recorded content, on-demand content, or some other form of content. The exemplary illustrated home automation information 404 is related to a water leak being detected in a second floor bathroom of a location. Such augmentation of the television programming may be performed directly by television receiver 150 (which may or may not be in communication with communication device 252) or overlay device 251 connected with television receiver 150 and display device 160. Such augmentation may result in solid or partially transparent graphics being overlaid onto television programming (or other forms of video) output by television receiver 150. Overlay device or television receive 150 may be configured to add or modify sound to television programming also or alternatively. For instance, in response to water leak detection, a sound may be played through the display device (or connected audio system). In addition or in alternate, a graphic may be displayed.

Such presented home automation information 404 may request user input. For instance, in FIG. 4, a user, via controls of television receiver 150 (e.g., a remote control) or controls of overlay device 251, can specify whether the water supply to the second floor bathroom should be shut off or not shut off, or if future notifications related to such detection such be ignored. If ignored, this may be for a predefined period of time, such as an hour, or until the television receiver 150 or overlay device 251 is powered down and powered back on. Ignoring of video may be particularly useful if the issue is being addressed, for example, by another individual in the home (e.g., a parent) other than an individual continuing to view content (e.g., a child).

Television receiver 150 or overlay device 251 may be configured to communicate with one or more wireless devices, such as wireless device 216. Wireless device 216 may represent a tablet computer, cellular phone, laptop computer, remote computer, or some other device through which a user may desire to control home automation settings and view home automation information. Such a device also need not be wireless, such as a desktop computer. Television receiver 150, communication device 252, or overlay device 251 may communicate directly with wireless device 216, or may use a local wireless network, such as network 270. Wireless device 216 may be remotely located and not connected with a same local wireless network. Via the internet, television receiver 150 or overlay device 251 may be configured to transmit a notification to wireless device 216 regarding home automation information. For instance, in some embodiments, a third-party notification server system, such as the notification server system operated by Apple®, may be used to send such notifications to wireless device 216.

In some embodiments, a location of wireless device 216 may be monitored. For instance, if wireless device 216 is a cellular phone, when its position indicates it is near a water-based feature of the home (e.g., in a bathroom, laundry room, etc.), this location information may be taken into account with water leak determinations disclosed further herein. In some embodiments, a user may be able to define a water-based landscape of the home based on a position of wireless device 216. For example, a user could define bathrooms, a laundry room, and other water-supplied locations of the home with the wireless device 216. A learning mode of the home automation system could allow the user to walk through the home and select user-selectable options to designate certain locations (e.g., bathrooms, a laundry room, and other water-supplied locations). Having such location definitions, the system could correlate that information with one or more water leak detection sensors in communication with television receiver 150. Thus, as disclosed further herein, upon detection of a possible water leak in the supply to a particular second floor bathroom, for example, the system may take into account whether an occupant is detected in the second floor bathroom based on the location of wireless device 216 and/or a set of one or more sensors such as a motion sensor, a light sensor, and/or the like.

In some embodiments, little to no setup of network 270 may be necessary to permit television receiver 150 to stream data out to the Internet. For instance, television receiver 150 and network 270 may be configured, via a service such as Sling® or other video streaming service, to allow for video to be streamed from television receiver 150 to devices accessible via the Internet. Such streaming capabilities may be "piggybacked" to allow for home automation data to be streamed to devices accessible via the Internet. For example, U.S. patent application Ser. No. 12/645,870, filed on Dec. 23, 2009, entitled "Systems and Methods for Remotely Controlling a Media Server via a Network", which is hereby incorporated by reference, describes one such system for allowing remote access and control of a local device. U.S. Pat. No. 8,171,148, filed Apr. 17, 2009, entitled "Systems and Methods for Establishing Connections Between Devices Communicating Over a Network", which is hereby incorporated by reference, describes a system for establishing connection between devices over a network. U.S. patent application Ser. No. 12/619,192, filed May 19, 2011, entitled "Systems and Methods for Delivering Messages Over a Network", which is hereby incorporated by reference, describes a message server that provides messages to clients located behind a firewall.

Figure 5:
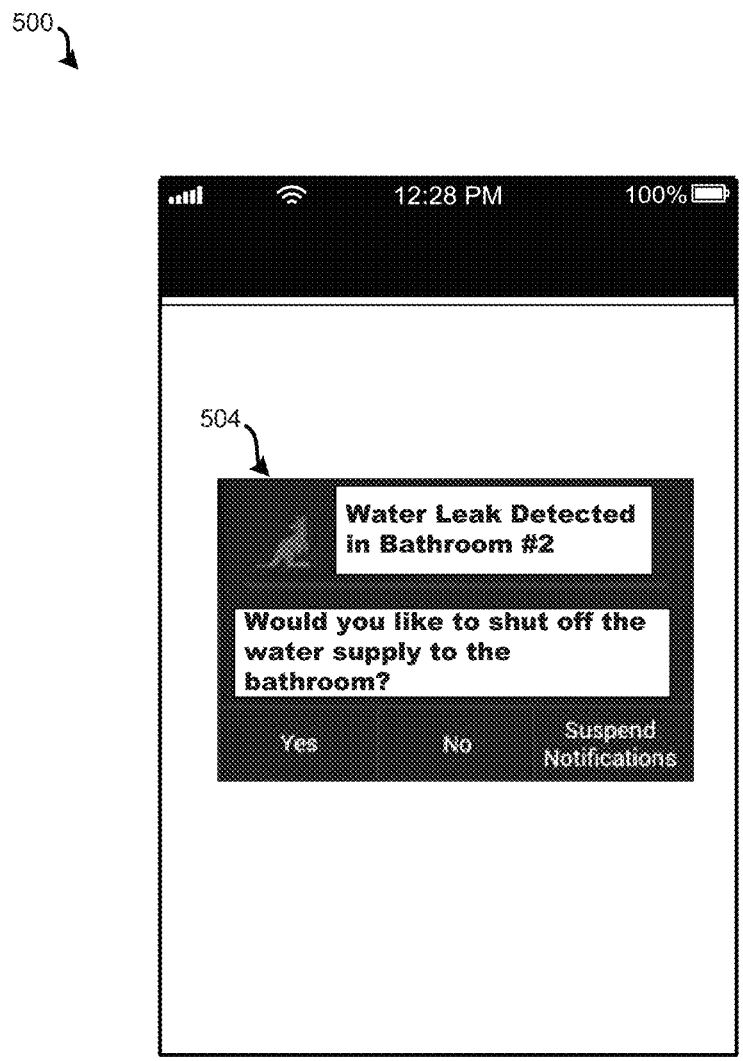
FIG. 5 illustrates an embodiment of a screenshot of a wireless device in communication with a television receiver configured to host a home automation system, in accordance with certain embodiments of the present disclosure.

As an example of how wireless device 216 may be used in conjunction with television receiver 150 or overlay device 251 for controlling a home automation system, FIG. 5 illustrates an embodiment of a screenshot 500 of a wireless device in communication with television receiver 150 serving as the host of a home automation system. In some embodiments, at approximately a same time that the home automation information of FIG. 4 is presented via display device 160 (assuming it is turned on), similar information 504 may be sent to wireless device 216, such as via a third-party notification server or directly from television receiver 150 or overlay device 251 via a local wireless network. With a notification 504, one or more user-selectable options may be provided to allow a user of wireless device 216 to specify whether the water supply should be shut off or not shut off, or if future notifications related to such detection such be ignored.

In some embodiments, the notification 504 may only be provided via the wireless device 216 and not the display device 160. In some embodiments, the notification 504 may be provided via the wireless device 216 only if the display device 160 is not in a display mode. In some embodiments, the notification 504 may be provided via the wireless device 216 if a response is not received responsive to a notification sent to the display device 160 after a threshold amount of time (e.g., to address instances where there are no viewers currently in the room or where a viewer has fallen asleep). Accordingly, various embodiments may provide a notification escalation scheme.

Wireless device 216 may serve as an input device for television receiver 150. For instance, wireless device 216 may be a tablet computer that allows text to be typed by a user and provided to television receiver 150. Such an arrangement may be useful for text messaging, group chat sessions, or any other form of text-based communication. Other types of input may be received for the television receiver from a tablet computer or other device as shown in the attached screenshots, such as lighting commands, security alarm settings and door lock commands. While wireless device 216 may be used as the input device for typing text, television receiver 150 may output for display text to display device 160.

Wireless device 216 may be configured to store a software model of home automation system intended to mirror the software model stored by television receiver 150, which is hosting the home automation system. For instance, such a software model may allow wireless device 216 to view, communicate with, and/or interact with various home automation devices. Such a software model may indicate the state of various home automation devices. When wireless device 216 is not in communication with television receiver 150, changes to the home automation model made at television receiver 150 may not be known to wireless device 216. Rather than a history list being maintained by television receiver 150, a synchronization point numerical value may be assigned to each change to the home automation model by television receiver 150. The synchronization point numerical value may increment for each change made. When wireless device 216 is reconnected with television receiver 150, a current synchronization point numerical value of television receiver 150 may be compared with a synchronization point numerical value of the last known changes stored by wireless device 216. If the synchronization point numerical value stored by television receiver 150 is greater than the synchronization point numerical value stored by wireless device 216, updates about the home automation system need to be sent to wireless device 216. Based on the difference in synchronization point numerical value of wireless device 216 and television receiver 150, it can be determined which changes need to be sent to wireless device 216 to make the software model of wireless device 216 match that of television receiver 150.

In some embodiments, a cellular modem 253 may be connected with either overlay device 251 or television receiver 150. Cellular modem 253 may be useful if a local wireless network is not available. For instance, cellular modem 253 may permit access to the internet and/or communication with a television service provider. Communication with a television service provider, such as television service provider system 110 of FIG. 1, may also occur via a local wireless or wired network connected with the Internet. In some embodiments, information for home automation purposes may be transmitted by television service provider system 110 to television receiver 150 or overlay device 251 via the television service provider's distribution network, which may include the use of satellites 130.

Various home automation devices may be in communication with television receiver 150 or overlay device 251. Such home automation devices may use disparate communication protocols. Such home automation devices may communicate with television receiver 150 directly or via communication device 252. Such home automation devices may be controlled by a user and/or have a status viewed by a user via display device 160 and/or wireless device 216. Such home automation devices may include any one or combination of: cameras 212; window sensor 210; door sensor 208; doorbell sensor 223; garage door controller 228; lock controller 230; smoke and/or $CO_2$ detectors 209; pet door and/or feeder 211; shade controller 204; light controller 220; thermostat 222; VoIP (voice over IP) controller 225; health sensor 214; weather sensor 206 that may allow television receiver 150 or overlay device 251 to receive, identify, and/or output various forms of environmental data, including temperature, humidity, wind speed, barometric pressure, etc.; and/or intercom 218.

In some embodiments, television receiver 150 may receive and notify a user of the status of electrical appliances such as refrigerators and dishwashers within the house. The television receiver 150 may be linked to the appliances and presents a notification message to the user through whatever device the user is using at the time, such as a tablet computer, mobile phone or thin client. U.S. patent application Ser. No. 12/700,310, filed Feb. 4, 2010, entitled "Electronic Appliance Status Notification via a Home Entertainment System", which is hereby incorporated by reference, describes such techniques in further detail.

Utility monitor 202 may serve to provide television receiver 150 or overlay device 251 with utility information, such as electricity usage, gas usage, water usage, wastewater usage, irrigation usage, etc. A user may view a status page or may receive notifications upon predefined events occurring, such as electricity usage exceeding a defined threshold within a month, or current kilowatt usage exceeding a threshold.

Data from certain devices may trigger parallel notifications. For instance, a mailbox open, a garage door open, an entry/exit door open during wrong time, an unauthorized control of specific lights during vacation period, a water sensor detecting a leak or flow, a temperature of room or equipment is outside of defined range, and/or motion detected at front door are examples of possible events which may trigger parallel notifications. A configuring user may be able to select from a list of users to notify and method of notification to enable such parallel notifications. The configuring user may prioritize which systems and people are notified, and specify that the notification may continue through the list unless acknowledged either electronically or by human interaction. For example, the user could specify that they want to be notified of any light switch operation in their home during their vacation. Notification priority could be 1) SMS Message, 2) push notification, 3) electronic voice recorder places call to primary number, and 4) electronic voice recorder places call to spouse's number. The second notification may never happen if the user replies to the SMS message with an acknowledgment. Or, the second notification would automatically happen if the SMS gateway cannot be contacted.

Leak detection sensor 224 may be in communication with television receiver 150 or verlay device 251 and may be used to determine when a water leak as occurred, such as in pipes supplying water-based fixtures with water. Leak detection sensor 224 may be configured to attach to the exterior of a pipe and listen for a sound of water moving within a pipe. In other embodiments, sonar, temperature sensors or ion-infused water with appropriate sensors may be used to detect moving water. As such, cutting or otherwise modifying plumbing may not be necessary to use leak detection sensor 224. In various embodiments, leak detection sensor 224 may include any suitable flow meter.

If water movement is detected for greater than a threshold period of time, it may be determined a leak is occurring. Leak detection sensor 224 may have a component that couples over an existing valve such that the flow of water within one or more pipes can be stopped. For instance, if leak detection sensor 224 determines a leak may be occurring, a notification may be provided to a user via wireless device 216 and/or display device 160 by television receiver 150 or overlay device 251. If a user does not clear the notification, the flow of water may be shut off by leak detection sensor 224 after a predefined period of time. A user may also be able to provide input to allow the flow of water to continue or to immediately interrupt the flow of water.

The home automation system may utilize various rules to determine whether a leak is occurring. For example, a measurement threshold may be utilized in the event that water is flowing to an ice machine. The amount of water typically drawn by such a device may be known, if the flow rate and/or flow time significantly exceeds normal operating parameters, it may be determined that a leak is occurring. In some embodiments, the home automation system may communicate with appliances to determine whether water is flowing to the device. For example, a home automation system may communicate with a washing machine in operation to determine that water is flowing to the appliance, and thus, determine that a water leak is not occurring. The appliance may transmit data to television receiver 150 or overlay device 251 that indicates the status of the appliance, such as an indication of whether the appliance is in operation or not, or using water or not.

If no appliance is using water (and, possibly, it is known that no user is home) it may be determined that a leak is occurring. In other embodiments, data from various motion sensors may be utilized. For example, if the system identifies that users have left the home, but a large flow of water is occurring, then the system may determine that a leak is occurring and notify a user or take remedial steps accordingly.

Appliance controller 226 may permit a status of an appliance to be retrieved and commands to control operation to be sent to an appliance by television receiver 150 or overlay device 251. For instance, appliance controller 226 may control a washing machine, a dryer, a dishwasher, an oven, a microwave, a refrigerator, a toaster, a coffee maker, a hot tub, or any other form of appliance. Appliance controller 226 may be connected with the appliance or may be integrated as part of the appliance.

Appliances and other electronic devices may also be monitored for electricity usage. For instance, US Pat. Pub. No. 2013/0318559, filed Nov. 19, 2012, to Crabtree, entitled "Apparatus for Displaying Electrical Device Usage Information on a Television Receiver", which is hereby incorporated by reference, may allow for information regarding the electricity usage of one or more devices (e.g., other home automation devices or circuits within a home that are monitored) to be determined. Control of one or more home automation devices may be dependent on electrical usage and stored electrical rates. For instance, a washing machine may be activated in the evening when rates are lower. Additionally or alternatively, operation of devices may be staggered to help prevent consuming too much power at a given time. For instance, an electric heater may not be activated until a dryer powered via the same circuit is powered down.

A home security system 207 may be integrated with a home automation system. The home security system 207 may detect motion, when a user has armed/disarmed the home security system 207, when windows/doors are opened or broken, etc.

Irrigation controller 232 may allow for a status and control of an irrigation system (e.g., sprinkler system) to be controlled by a user via television receiver 150 and/or overlay device 251. Irrigation controller 232 may be used in conjunction with weather sensor 206 to determine whether and/or for how long irrigation controller 232 should be activated for watering. Further, a user, via television receiver 150 and/or overlay device, may turn on, turn off, or adjust settings of irrigation controller 232.

One or more motion sensors can be incorporated into one or more of the previously detailed home automation devices or as a stand-alone device. Such motion sensors may be used to determine if a structure is occupied. Such information may be used in conjunction with a determined location of one or more wireless devices. If some or all users are not present in the structure, home automation settings may be adjusted, such as by lowering a temperature of thermostat 222, shutting off lights via light controller 220, and determining if one or more doors are closed by door sensor 208. In some embodiments, a user-defined script may be run when it is determined that no users or other persons are present within the structure.

Additional forms of sensors not illustrated in FIG. 2 may also be incorporated as part of a home automation system. The ability to control one or more showers, baths, and/or faucets from television receiver 150 and/or wireless device 216 may also be possible.

To be clear, the home automation functions detailed herein that are attributed to television receiver 150 may alternatively or additionally be incorporated into overlay device 251. As such, a separate overlay device 251 may be connected with display device 160 to provide home automation functionality.

Figure 3:
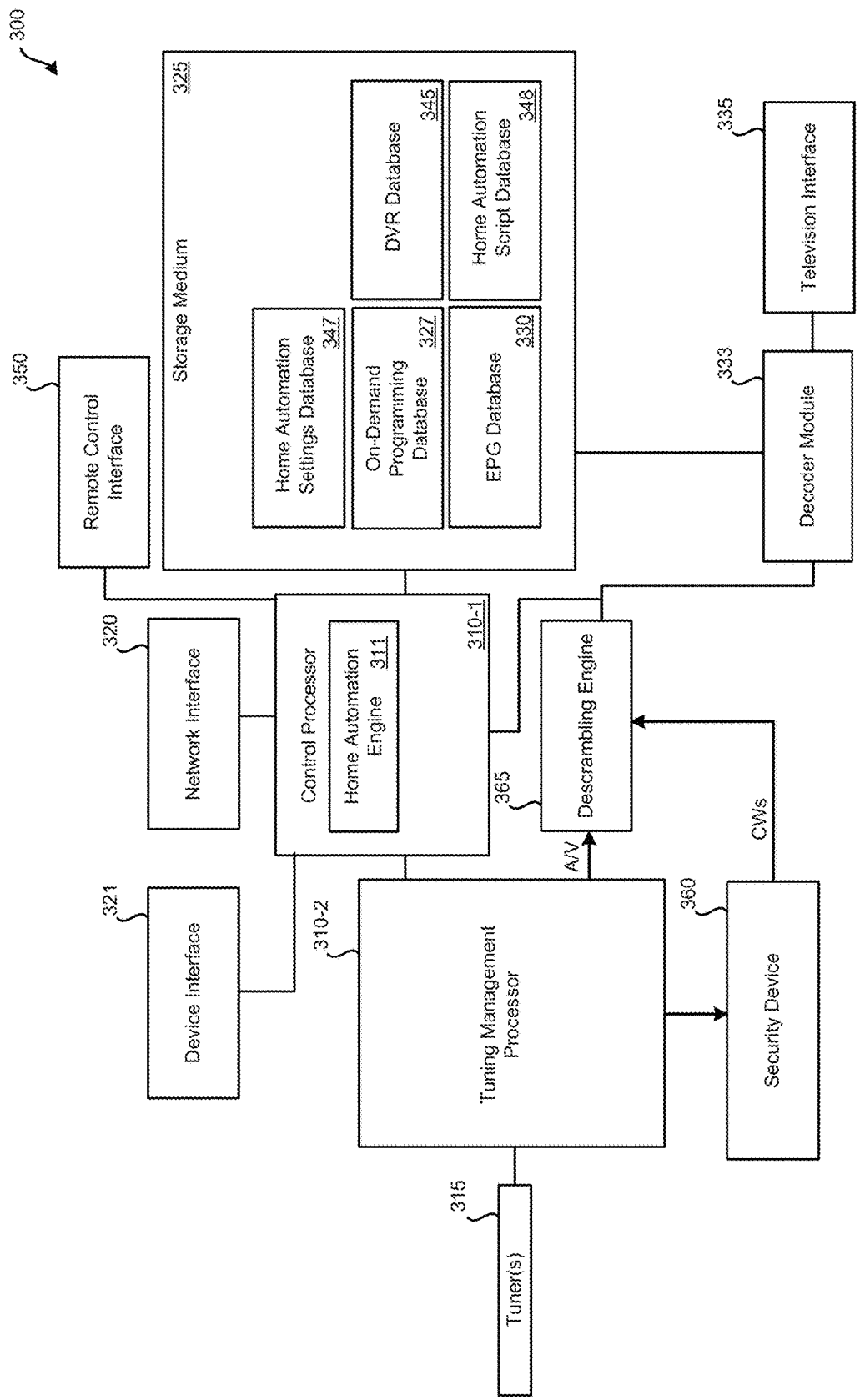
FIG. 3 illustrates an embodiment of a television receiver configured to host a home automation system, in accordance with certain embodiments of the present disclosure.

FIG. 3 illustrates an embodiment of a television receiver 300, which may represent television receiver 150 of FIG. 1 and/or FIG. 2. Television receiver 300 may be configured to function as a host for a home automation system either alone or in conjunction with a communication device, such as communication device 252 of FIG. 2. Television receiver 300 may be in the form of a separate device configured to be connected with a display device, such as a television. Embodiments of television receiver 300 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 300 may be incorporated as part of a television, such as display device 160 of FIG. 1. Television receiver 300 may include: processors 310 (which may include control processor 310-1, tuning management processor 310-2, and possibly additional processors), tuners 315, network interface 320, non-transitory computer-readable storage medium 325, electronic programming guide (EPG) database 330, television interface 335, digital video recorder (DVR) database 345 (which may include provider-managed television programming storage and/or user-defined television programming), on-demand programming database 327, home automation settings database 347, home automation script database 348, remote control interface 350, security device 360, and/or descrambling engine 365. In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2. Further, functionality of components may be spread among additional components.

Processors 310 may include one or more specialized and/or general-purpose processors configured to perform processes such as tuning to a particular channel, accessing and displaying EPG information from EPG database 330, and/or receiving and processing input from a user. It should be understood that the functions performed by various modules of FIG. 3 may be performed using one or more processors. As such, for example, functions of descrambling engine 365 may be performed by control processor 310-1.

Control processor 310-1 may communicate with tuning management processor 310-2. Control processor 310-1 may control the recording of television channels based on timers stored in DVR database 345. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may also communicate with network interface 320 and remote control interface 350. Control processor 310-1 may handle incoming data from network interface 320 and remote control interface 350. Additionally, control processor 310-1 may be configured to output data via network interface 320.

Control processor 310-1 may include home automation engine 311. Home automation engine 311 may permit television receiver and control processor 310-1 to provide home automation functionality. Home automation engine 311 may have a JSON (JavaScript Object Notation) command interpreter or some other form of command interpreter that is configured to communicate with wireless devices via network interface 320 and a message server (possibly via a message server client). Such a command interpreter of home automation engine 311 may also communicate via a local area network with devices (without using the Internet). Home automation engine 311 may contain multiple controllers specific to different protocols; for instance, a ZigBee® controller, a Z-Wave® controller, and/or an IP camera controller (wireless LAN, 802.11) may be present. Home automation engine 311 may contain a media server configured to serve streaming audio and/or video to a remote device(s) (on a local area network or the Internet). Television receiver may be able to serve such devices with recorded content, live content, and/or content recorded using one or more home automation devices, such as camera 212.

Tuners 315 may include one or more tuners used to tune to transponders that include broadcasts of one or more television channels. Such tuners may be used also to receive for storage on-demand content and/or credit-earning television commercials. In some embodiments, two, three, or more than three tuners may be present, such as four, six, or eight tuners. Each tuner contained in tuners 315 may be capable of receiving and processing a single transponder stream from a satellite transponder (or from a cable network) at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 to which frequencies are to be tuned.

Network interface 320 may be used to communicate via an alternate communication channel with a television service provider, if such communication channel is available. A communication channel may be via satellite (which may be unidirectional to television receiver 300) and the alternate communication channel (which may be bidirectional) may be via a network, such as the Internet. Data may be transmitted from television receiver 300 to a television service provider system and from the television service provider system to television receiver 300. Information may be transmitted and/or received via network interface 320. For instance, instructions from a television service provider may also be received via network interface 320, if connected with the Internet. Besides the primary communication channel being satellite, cable network, an IP-based network, or broadcast network may be used. Network interface 320 may permit wireless communication with one or more types of networks, including using home automation network protocols and wireless network protocols. Also, wired networks may be connected to and communicated with via network interface 320. Device interface 321 may represent a USB port or some other form of communication port that permits communication with a communication device.

Storage medium 325 may represent one or more non-transitory computer-readable storage mediums. Storage medium 325 may include memory and/or a hard drive. Storage medium 325 may be used to store information received from one or more satellites and/or information received via network interface 320. Storage medium 325 may store information related to on-demand programming database 327, EPG database 330, DVR database 345, home automation settings database 347, and/or home automation script database 348. Recorded television programs may be stored using storage medium 325 as part of DVR database 345. Storage medium 325 may be partitioned or otherwise divided (such as into folders) such that predefined amounts of storage medium 325 are devoted to storage of television programs recorded due to user-defined timers and stored television programs recorded due to provider-defined timers.

Home automation settings database 347 may allow configuration settings of home automation devices and user preferences to be stored. Home automation settings database 347 may store data related to various devices that have been set up to communicate with television receiver 300. For instance, home automation settings database 347 may be configured to store information on which types of events should be indicated to users, to which users, in what order, and what communication methods should be used. For instance, an event such as a water leak condition may only be notified to certain wireless devices (e.g., a cellular phone associated with a parent, not a child), notification may be by a third-party notification server, email, text message, and/or phone call. In some embodiments, a second notification method may only be used if a first fails to prompt a response (e.g., to address with the water leak condition with a selection of a user-selectable option provided with the notification). For instance, if a notification cannot be sent to the user via a third-party notification server, an email may be sent.

Home automation settings database 347 may store information that allows for the configuration and control of individual home automation devices which may operate using Z-wave and Zigbee-specific protocols. To do so, home automation engine 311 may create a proxy for each device that allows for settings for the device to be passed through a UI (e.g., presented on a television) to allow for settings to be solicited for and collected via a user interface presented by television receiver or overlay device. The received settings may then be handled by the proxy specific to the protocol, allowing for the settings to be passed on to the appropriate device. Such an arrangement may allow for settings to be collected and received via a UI of the television receiver or overlay device and passed to the appropriate home automation device and/or used for managing the appropriate home automation device.

Home automation script database 348 may store scripts that detail how home automation devices are to function based on various events occurring. For instance, such scripts or programs may be used to facilitate leak detection and handling features disclosed herein, and may be predefined by the home automation/television service provider and/or may be defined by a user.

EPG database 330 may store information related to television channels and the timing of programs appearing on such television channels. Decoder module 333 may serve to convert encoded video and audio into a format suitable for output to a display device.

Television interface 335 may serve to output a signal to a television (or another form of display device) in a proper format for display of video and playback of audio. As such, television interface 335 may output one or more television channels, stored television programming from storage medium 325 (e.g., television programs from DVR database 345, television programs from on-demand programming 330 and/or information from EPG database 330) to a television for presentation. On-demand programming database 327 may store additional television programming.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television. Television receiver 300 may include one or more instances of various computerized components, such as disclosed in relation to computer system 700 of FIG. 7.

While the television receiver 300 has been illustrated as a satellite-based television receiver, it is to be appreciated that techniques below may be implemented in other types of television receiving devices, such a cable receivers, terrestrial receivers, IPTV receivers or the like. In some embodiments, the television receiver 300 may be configured as a hybrid receiving device, capable of receiving content from disparate communication networks, such as satellite and terrestrial television broadcasts. In some embodiments, the tuners may be in the form of network interfaces capable of receiving content from designated network locations. The home automation functions of television receiver 300 may be performed by an overlay device. If such an overlay device, television programming functions may still be provided by a television receiver that is not used to provide home automation functions.

Figure 6:
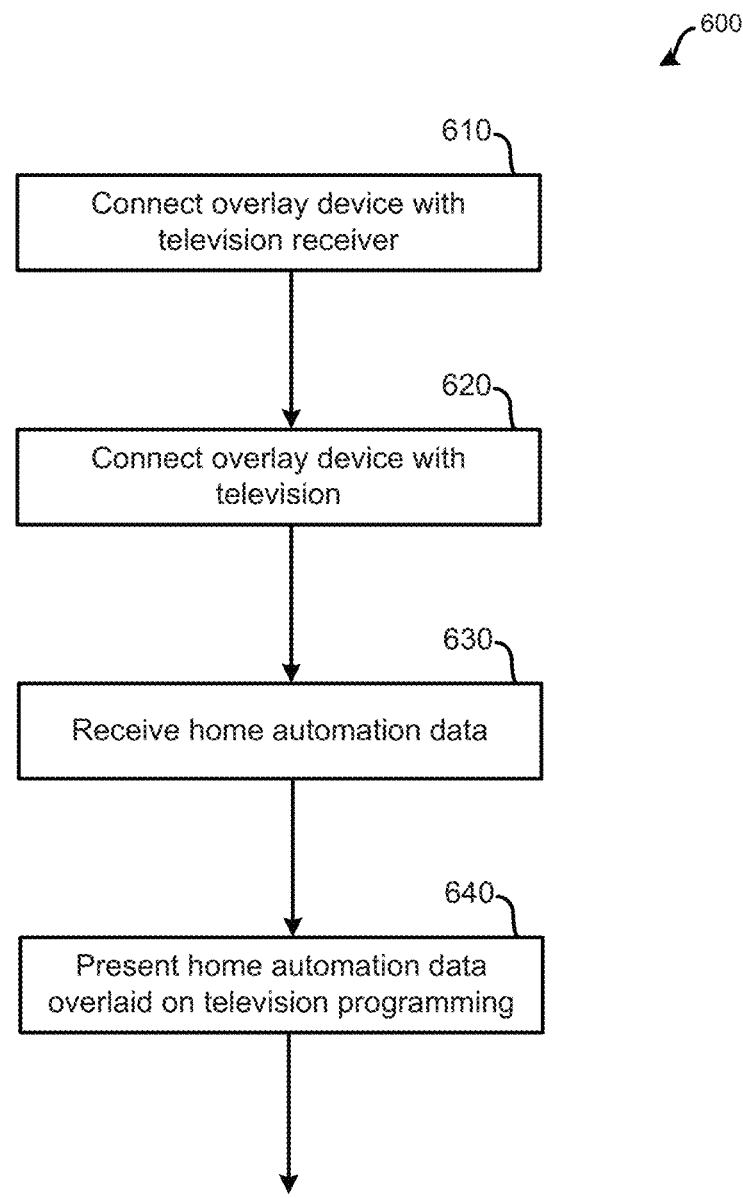
FIG. 6 illustrates an embodiment of a method for using an overlay device to output information to a display device for presentation, in accordance with certain embodiments of the present disclosure.

FIG. 6 illustrates an embodiment of a method 600 for using an overlay device to output information to a display device for presentation, in accordance with certain embodiments of the present disclosure. At step 610, the overlay device may be connected with a television receiver, such as via an HDMI input of the overlay device and HDMI output of the television receiver. The overlay device may also be connected with one or more additional devices that output audio and/or video, such as a DVD player, internet streaming device or the like. At step 620, the overlay device may be connected via an output (e.g., HDMI output) with a display device, such as a television. The overlay device may receive home automation information at step 630. At step 640, home automation information may be overlaid onto video received from the television receiver or from some other device that is to be presented by the display device. The overlay device may output modified video that includes the home automation information and at least some of the received video to the display device. The home automation information may be overlaid onto the video received from the television receiver or other device. The user may therefore view content and home automation information simultaneously by looking at the display device.

Figure 7:
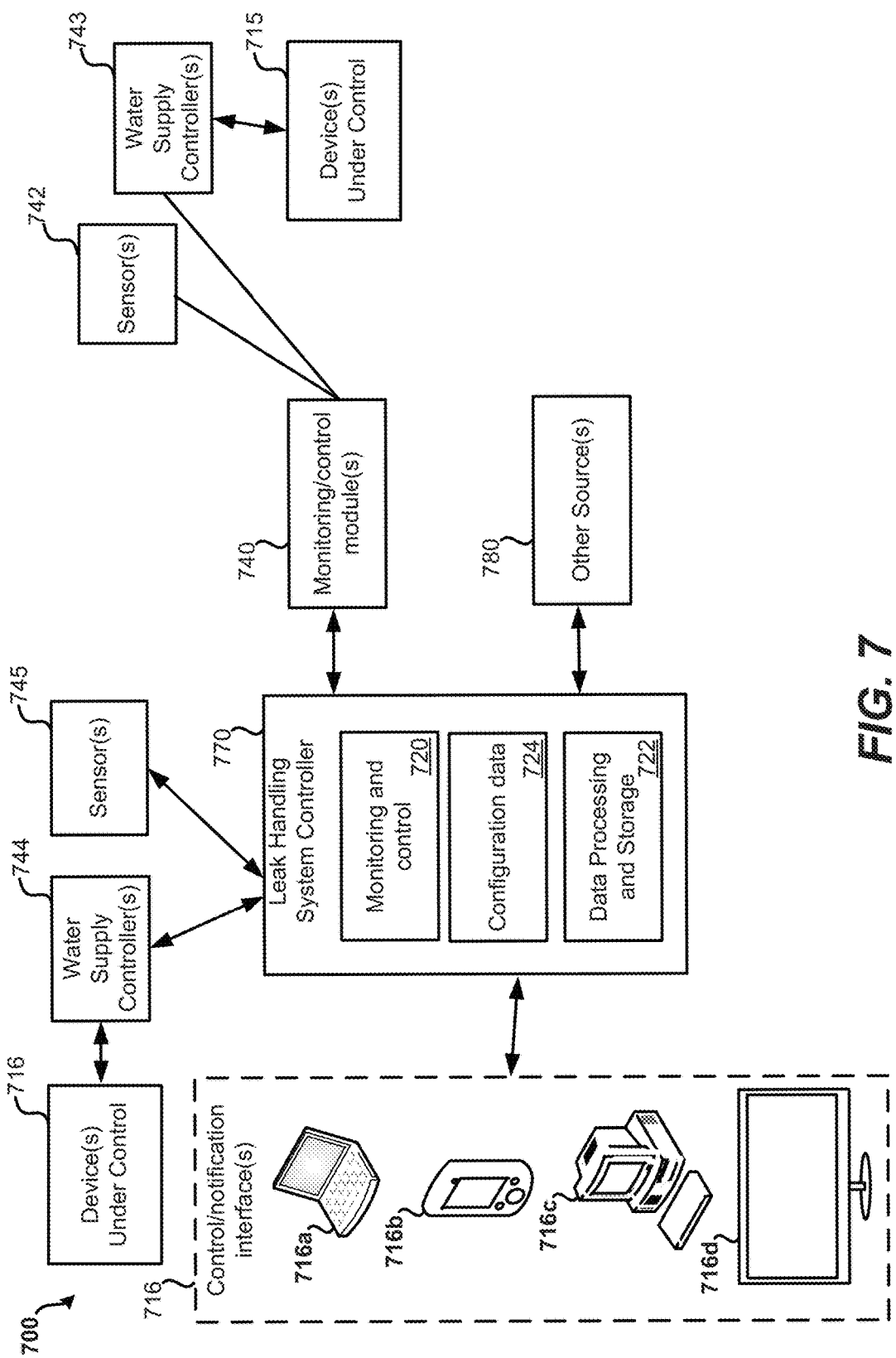
FIG. 7 illustrates a diagram of an overview of an embodiment of a system to facilitate automation control for water leaks, in accordance with certain embodiments of present disclosure.

FIG. 7 illustrates a diagram of an overview of an embodiment of a system 700 to facilitate automation control for water leaks, in accordance with certain embodiments of present disclosure. For brevity, system 700 is depicted in a simplified and conceptual form, and may generally include more or fewer systems, devices, networks, and/or other components as desired. Further, the number and types of features or elements incorporated within the system 700 may or may not be implementation-specific.

In certain embodiments, the system 700 may correspond to the home automation system described herein. In some embodiments, the system 700 may be a subsystem of the home automation system described herein. The system 700 may include a leak handling system controller 770. In various embodiments, the system controller 770 may be included in a television receiver 150, set-top box (which may include a television receiver 150, in some embodiments), a television or other display device 160 (which may include a television receiver 150, in some embodiments), overlay device 251, or another household device.

The system controller 770 may be configured to manage one or more other components of the system that communicatively coupled to the system controller 770 via any suitable means, including wired and/or wireless connections. The system controller 770 may be communicatively coupled to one or more control and/or notification interfaces 716. In some embodiments, one or more interfaces 716 may be capable of user notification, showing the status, configuration data, and/or the like. The one or more interfaces 716 may be devices that are directly or indirectly connected to the system controller 770 and may receive information, such as notifications, from the system controller 770. The interfaces 716 may include one or more of any suitable computing system or device, including television receiver 150, overlay device 251, communication device 252, wireless device 216, tablets, and/or the like. In various embodiments, the interfaces 716 may include one or more devices such as laptops 716a, mobile phones 716b, PCs 716c, and/or televisions/monitors 716d, which are depicted as exemplary.

The system controller 770 may provide a user interface (e.g., via interface 716) to allow for output of information to a user and for input from user with one or more user-selectable options. In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more icons, widgets, buttons, checkboxes, text, text boxes, text fields, tables, lists, and/or the like.

In certain embodiments, the system controller 770 may include a monitoring and control module 720. Sensors and control units may be wired or wirelessly coupled to the system controller 770. Sensors and control units may be coupled and connected in a serial, parallel, star, hierarchical, and/or the like topologies and may communicate to the television receiver via one or more serial, bus, or wireless protocols and technologies which may include, for example, WiFi, CAN bus, Bluetooth, I2C bus, ZigBee, Z-Wave and/or the like.

In some embodiments, the system 700 may include one or more monitoring/control modules 740 which could be external to the system controller 770. In some embodiments, the system controller 770 may interface to one or more sensors and control units via one or more monitoring/control modules 740. The external monitoring/control modules 740 may be wired or wirelessly coupled to the system controller 770. In some embodiments, the monitoring/control module 740 may connect to the system controller 770 via a communication port such as a USB port, serial port, and/or the like. In some embodiments, the monitoring/control module 740 may connect to the system controller 770 via a wireless communication protocol such as Wi-Fi, Bluetooth, Z-Wave, ZigBee, and/or the like. The external monitoring/control module may include a separate device that may be positioned near the system controller 770 (e.g., in embodiments where a television receiver includes the system controller 770) or may be in a different location, remote from the system controller 770.

The system controller 770 may be configured to receive readings from one or more sensors and/or sensor systems 742, 745. Monitoring and control modules 720, 740 may be coupled to components such as sensors 742, 745. Sensors 742, 745 may include any one or combination of temperature, sound, proximity, field, electromagnetic, magnetic sensors, cameras, infrared detectors, motion sensors, pressure sensors, water sensors, and/or the like. A set of one or more sensors 742 and/or 745 may be configured to detect one or more metrics indicative of water flow. For example, sensors 742 and/or 745 may include one or more leak detection sensors that may be used to determine when a water leak as occurred, such as in pipes supplying water-based fixtures with water. A leak detection sensor may be configured to attach to the exterior of a pipe and listen for a sound of water moving within a pipe, detect temperature differences indicative of water flow, detect ion-infused water, and/or the like.

Figure 8:
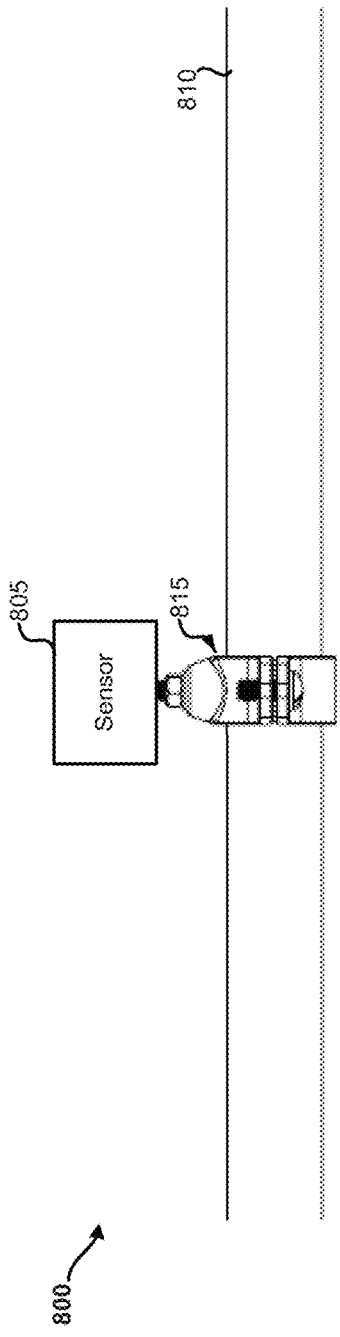
FIG. 8 depicts a view of an example water leak detection sensor, in accordance with certain embodiments of the present disclosure.

FIG. 8 depicts a view 800 of an example water leak detection sensor 805, which may correspond to one or more sensors 742 and/or 745, in accordance with certain embodiments of the present disclosure. The sensor 805 may be configured to attach to the exterior of a pipe 810 without cutting or otherwise modifying plumbing. Any suitable coupling 815 (e.g., C-clamp assembly, quick release clamp, adhesive, and/or the like) may be used in accordance with various embodiments to mechanically couple sensor 805 to the pipe 810.

Referring again to FIG. 7, in some embodiments, a set of one or more sensors 742 and/or 745 may be configured to detect one or more indications of states of water-supplied devices devices 715, 716, such as washing machines, dishwashers, refrigerators, ice makers, sinks, bathtubs, toilets, sprinklers, and/or the like. In some embodiments, sensors 742 and/or 745 may be included in one or more control and/or monitoring units of the water-supplied devices 715, 716. In some embodiments, monitoring and control modules 720, 740 may be configured to communicate with one or more control and/or monitoring units of water-supplied devices 715, 716. For example, monitoring and control modules 720, 740 may communicate with appliances to determine whether water is flowing to the device.

In some embodiments, a set of one or more sensors 742 and/or 745 may be configured to indicates presence and/or one or more locations of one or more occupants of the home, as disclosed herein. In some embodiments, one or more of sensors 742, 745 may be part of other devices, systems, and/or subsystems. For example, one or more sensors 742, 745 may be part of a mobile device such as a smartphone. The telemetry readings of the sensors 742, 745 may be accessed through a wireless communication interface such as a Bluetooth connection from the smartphone. In some embodiments, one or more sensors 742, 745 may include one or more cameras configured to have a field of view that may detect one or more individuals in proximity to the one or more sensors 742, 745. As yet another example, motion sensors 742, 745 may be part of a security system of a home, and the motion detection input may be gathered via a communication interface of the security system.

The system controller 770 may be configured to provide signals for controlling one or more water supply controllers 743, 744, which may be control units and/or systems. The water supply controllers 743, 744 may be disposed at any suitable point(s) on one or more water supply lines at a home and may be allow for controlling water supply to devices under control 715, 716. The water supply controllers 743, 744 may be individually identifiable.

Figure 9:
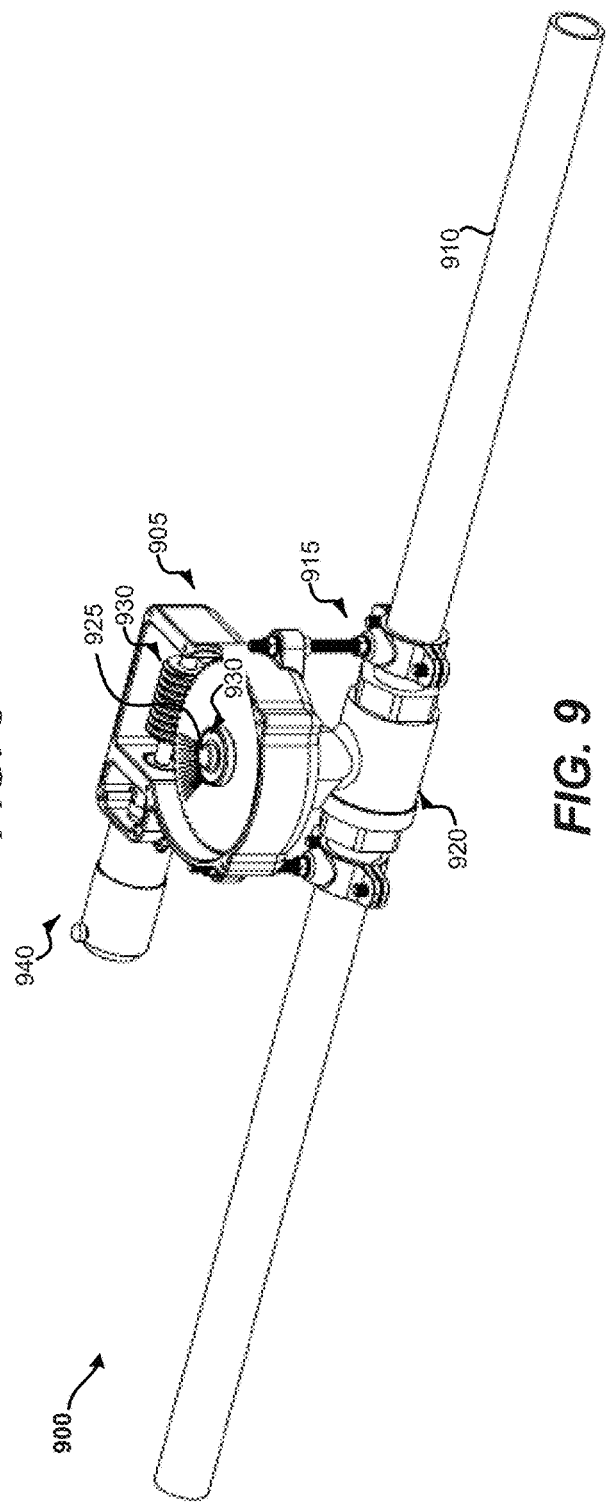
FIG. 9 depicts a view of an example water supply controller, in accordance with certain embodiments of the present disclosure.

FIG. 9 depicts a view 900 of an example water supply controller 905, which may correspond to one or more water supply controllers 743, 744, in accordance with certain embodiments of the present disclosure. The water supply controller 905 may be configured to attach to the exterior of a pipe 910 without cutting or otherwise modifying plumbing beyond mounting to an existing valve. The water supply controller 905 may allow for easy retrofitting on conventional valves already installed in conventional plumbing systems. The water supply controller 905 may be adapted to couple to a stem 925 of an original valve 920 in the plumbing system of the home. The original valve 920 may be a typical manual valve with a lever arm (not shown) or turn wheel (not shown) requiring manual activation to turn the lever arm or turn wheel, and hence the stem 925, and thereby shut off or turn on water supply through the pipe 910. The typical lever arm or turn wheel is the stem 925 via a nut and thread arrangement. When the nut and lever arm or turn wheel is removed, the water supply controller 905 may be mounted on the valve 920 and coupled to the stem 925 in any suitable manner. In the example depicted, a gear arrangement 930 is adapted to engage the stem 925. In some embodiments, the gear arrangement 930 may be preselected to match the size of the stem 925. In some embodiments, the gear arrangement 930 may be adjustable to adapt to varying sizes of valve stem 925. For example, in some embodiments, an insert 935 may be disposed between the gear arrangement 930 and the valve stem 925 to allow for proper fitting. However, any suitable mechanism for adjusting to adapt to varying sizes (such as quick release mechanisms and/or the like) may be employed in various embodiments.

An actuator 940 of any suitable type may be adapted to engage and drive the gear arrangement 930 in any suitable manner. The water supply controller 905 may include any suitable type and number of switches, solenoids, solid state devices and control modules to allow for control of the device, communication modules to allow for communication with the system controller 770 via any suitable protocol such as those discussed herein, a power storage, microcontroller, and/or the like. Any suitable coupling 915 (e.g., C-clamp assembly, quick release clamp, adhesive, and/or the like) may be used in accordance with various embodiments to mechanically couple water supply controller 905 to the pipe 915 so that the controller 905 remain stationary when actuating the valve stem 925.

In some embodiments, water supply controller 905 may have an integrated sensor to determine if the valve is open, shut, or partially open. Water supply controller 905 may be configured to provide a status as to the position of the valve. The sensor could, for example, detect varying levels of resistance that could be correlated to the valve being moved to a fully open state, a fully closed state, and an intermediate state. In some embodiments, water supply controller 905 may be configured with a learning mode that correlates numbers of turns of the stem 925 with a detected water flow (e.g., from any suitable sensor readings disclosed herein) to identify the numbers of turns to a fully closed position from a fully open position, and vice versa.

Referring again to FIG. 7, in some embodiments, one or more of the sensors 742, 745 and/or water supply controllers 743, 744 may be combined into assemblies or units with multiple sensing capabilities and/or control capabilities. During operation of the system 700, readings from the sensors may be collected, stored, and/or analyzed in the system controller 770. In certain embodiments, analysis of the sensors and control of the control units may be determined with configuration data 724 stored in the system controller 770. The configuration data may define how the sensor data is collected, how often, what periods of time, what accuracy is required, and other characteristics. The configuration data may specify specific sensor and/or control unit settings for a monitoring and/or control application. The configuration data may define how the sensor readings are processed and/or analyzed. For example, for some applications, sensor analysis may include collecting sensor readings and performing time-based analysis to determine trends/profiles. For other applications, sensor analysis may include monitoring sensor readings to determine if a threshold value of one or more sensor readings has been reached.

The function of the system 700 may be determined by loading and/or identifying configuration data for an application. In some embodiments, the system 700 may be configured for more than one monitoring or control operation by selecting or loading the appropriate configuration data. Configuration data may define monitoring operations, reactive measures, activation constraints for components of the system, and/or the like.

Readings processed by the monitoring and control modules 720, 740 may be logged and analyzed by the data processing and storage module 722. The data processing and storage 722 module may analyze the received data and generate control signals, schedules, and/or sequences for controlling components. The data processing and storage module 722 may, for example, receive sensor data from temperature sensors, motion sensors, location sensors, light sensors, and/or the like.

In some embodiments, system controller 770 may include the option for inputs from one or more other sources 780. The one or more other sources 780 could include any suitable sensor or other data source, which could be network-accessible, such as a service provider or private/public data source. For example, in some embodiments, in some embodiments, a service provider or other data source may facilitate locating a user of a mobile communication device, for example, by use GPS coordinates, cellular tower triangulation techniques, Wi-Fi-based location information, carrier-provided location information, and/or other location determination systems to identify a location of the mobile communication device and/or that the user is currently using the mobile communication device. Any suitable data may be acquired by the system controller 770 from one or more other sources 780.

Figure 10:
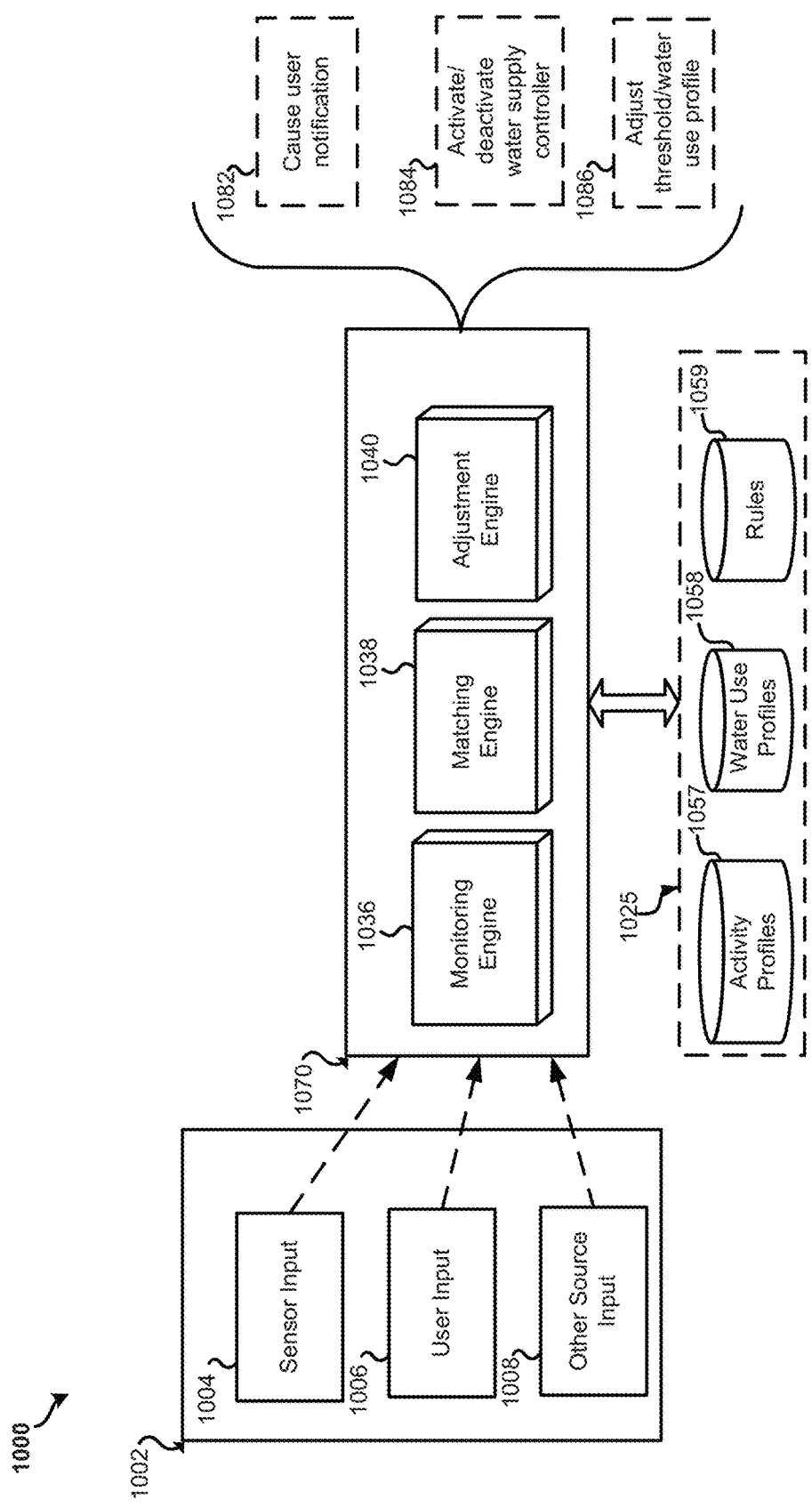
FIG. 10 illustrates a subsystem to facilitate for enabling automation control for water leak detection and handling, in accordance with certain embodiments of the present disclosure.

FIG. 10 illustrates a subsystem 1000 to facilitate for enabling automation control for water leak detection and handling, in accordance with certain embodiments of the present disclosure. As depicted, the subsystem 1000 includes a system control engine 1070, which may be included in the system controller 770 and may executed by one or more processors of the system controller 770 in certain embodiments. The system control engine 1070 may be communicatively coupled with interface components and communication channels (which may take various forms in various embodiments as disclosed herein) configured to receive adjustment input 1002. As depicted, the adjustment input 1002 may include sensor input 1004. The subsystem 1000 may process sensor input 1004 and analyze the sensor input 1004 to facilitate water leak detection and handling. The sensor input 1004 may be captured by any suitable sensors disclosed herein, such as sensors 742, 745. The control engine 1070 may include a monitoring engine 1036 configured to monitor the adjustment input 1002 for any suitable aspects pertaining to activities in the home. For example, the monitoring engine 1036 may process information enabling detection of the presence and/or one or more locations of one or more occupants of the home and/or detection of one or more states of one or more water-supplied devices of the home. In some embodiments, the monitoring engine 1036 may correspond to the monitoring and control module 720.

The adjustment input 1002 may include user input 1006. The user input 1006 may include real-time user control via a user interface (e.g., one or more interfaces 716). The user input 1006 may include previously acquired user preferences. The adjustment input 1002 may include other source input 1008, which could correspond to input from one or more other sources 180. As disclosed herein, other source input 1008 may include any suitable sensor input or other data source input. Such input could include data from a service provider or private/public data source, such as location of a mobile communication device.

One or more storage repositories 1025 (which could correspond to data storage 722, in some embodiments) may store one or more activity profiles 1057. Activity profiles may identify any suitable information indicative of particular activity circumstances in/about the home with respect to occupants located in the home and/or activity of water-supplied devices in/about the home. For example, an activity profile could specify certain circumstances that affect water flow characteristics, such as one or a combination of: the operation of certain water-supplied devices; the presence/locations of occupants in the home; time of day; time of year; and/or the like.

In some embodiments, the control engine 1070 may include a matching engine 1038. The matching engine 1038 could match detected input 1002 to one or more activity profiles 1057 to identify particular activity circumstances. In some cases where a match cannot be found, the matching engine 1038 could be configured to define a new activity profile 1057.

The matching engine 1038 may be configured to match detected input 1002 captured via the monitoring engine 1036 to one or more activity profiles 1057. In some embodiments, the matching engine 1038 can receive sensor data corresponding to one or more particular activity circumstances, identify attributes of the one or more activity circumstances based at least in part on the sensor data, and match the one or more activity circumstances to one or more activity profiles from activity profiles 1057.

The one or more storage repositories 1025 may include water use profiles 1058. In some embodiments, monitoring engine 1036 may be configured to may generate the water use profiles 1058. In some embodiments, water use profiles 1058 may be based at least in part on the activity profiles 1057. Water use profiles 1058 may specify water flow characteristics corresponding to the various circumstances identified with the activity profiles 1057. Water use profiles 1058 may identify any suitable information indicative of water use with respect to one or a combination of: the operation of certain water-supplied devices; the presence/locations of occupants in the home; time of day; time of year; and/or the like.

The one or more storage repositories 1025 may include rules 1059. In some embodiments, the rules 1059 may include criteria to facilitate any features described herein to determine whether a leak is occurring. In some embodiments, the rules 1059 may include one or more rules for matching detected input 1002 to activity profiles. In some embodiments, the rules 1059 may include one or more rules for handling detected input 1002 in view of water use profiles 1058. In some embodiments, the rules 1059 may include one or more rules for determining adjustments and notifying users.

The system control engine 1070 may include an adjustment engine 1040 which may be configured to cause one or more adjustments. The adjustment engine 1040 may analyze input monitored by the monitoring engine 1036, determinations of the matching engine 1038, and/or information stored in one or more repositories 1025 to make adjustment determinations. Based at least in part on one or more adjustment determinations, the adjustment engine 1040 may cause activation of one or more adjustment actions. Such actions may include any one or combination of: causing a user notification 1082; activating a water supply controller 1084; changing a threshold 1086 associated with a water use profile 1058 or otherwise modifying a water use profile 1058 (e.g., based on user input/feedback with regard to a notification of a water leak condition); and/or the like.

Figure 11:
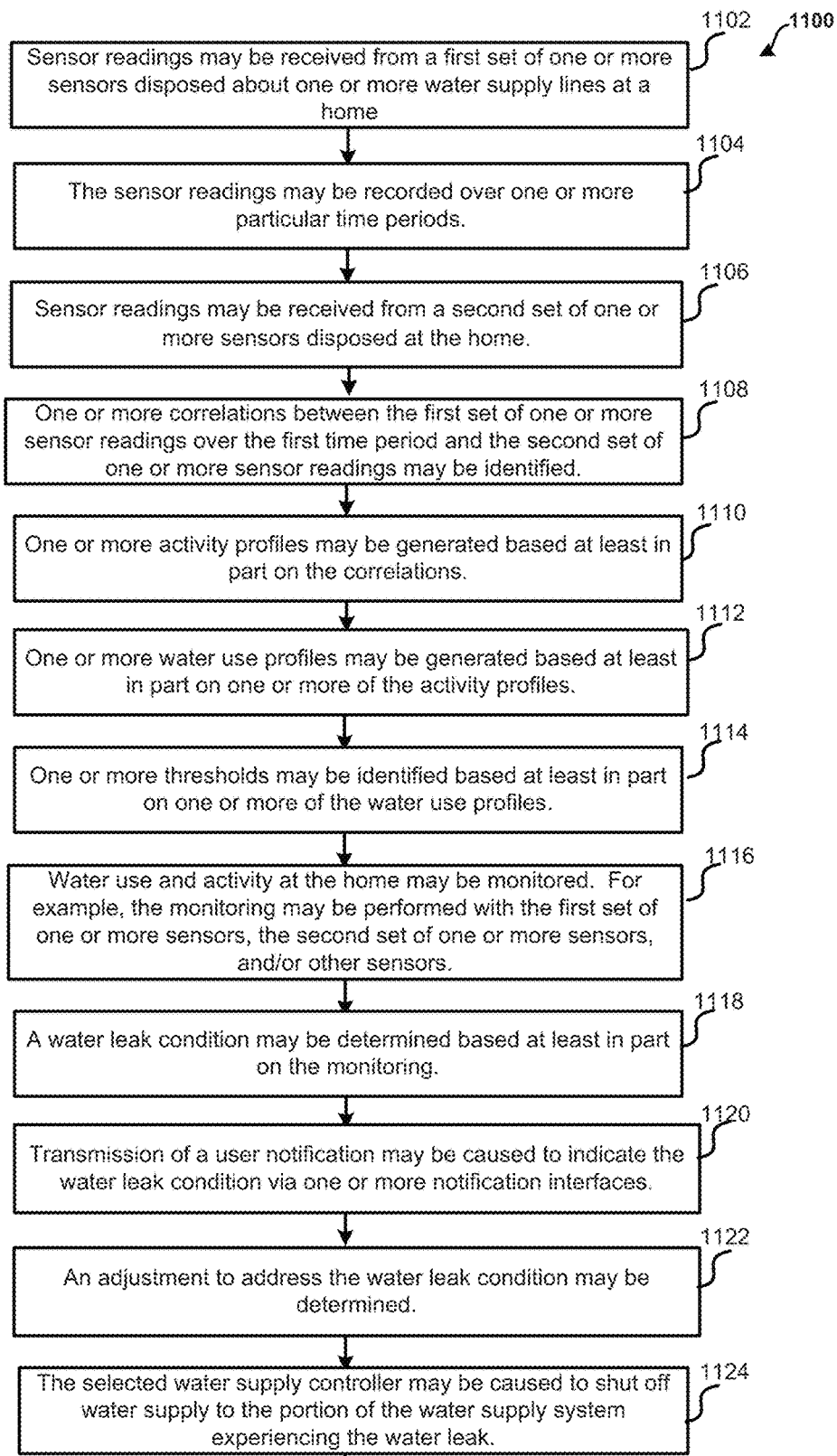
FIG. 11 illustrates an example method for enabling automation control for water leak detection and handling, in accordance with certain embodiments of the present disclosure.

FIG. 11 illustrates an example method 1100 for enabling automation control for water leak detection and handling, in accordance with certain embodiments of the present disclosure. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously. In some embodiments, the leak handling system controller 770 may perform any one or combination of the steps of method 1100. According to certain embodiments, the method 1100 may begin as indicated by block 1102.

As indicated by block 1102, sensor readings may be received from a first set of one or more sensors disposed about one or more water supply lines at a home. The first set of one or more sensors may be configured to detect a first type of one or more metrics indicative of water flow, for example, as disclosed herein, by way of sonar, temperature detection, etc.

As indicated by block 1104, the sensor readings may be recorded over one or more particular time periods. Any suitable time period may be used in various embodiments. In some embodiments, the time period may depend on the amount of water flow detected. For example, a longer time period may be selected by the controller for a smaller flow that does not exceed a low threshold. Conversely, a shorter time period may be selected by the controller for a larger flow that exceeds the low threshold, and perhaps a medium and/or high threshold.

As indicated by block 1106, sensor readings may be received from a second set of one or more sensors disposed at the home. In some embodiments, the second set of sensors may be configured to detect the presence and/or one or more locations of one or more occupants of the home. As disclosed herein, the sensor input may include indicia of one or more locations of one or more occupants of a home. For example, in various embodiments, input may be gathered from location-detecting sensors such as motion sensors, cameras, light sensors, smartphones, third-party data sources, and/or the like. Various embodiments may allow for varying degrees of location identification. In some embodiments, the determination of a location of an occupant may be relegated to generally detecting an occupant within a home. Other embodiments may detect occupant location with more specificity. For example, certain embodiments may determine an occupant is in a particular level of the home, room of a home, part of a room, etc. In addition or in the alternative, in some embodiments, the second set of sensors may be configured to detect one or more states of one or more water-supplied devices of the home. It may be determined whether water is flowing during the first time period to devices that are downstream of the first set of one or more sensors with respect to one or more water supply lines.

As indicated by block 1108, one or more correlations between the first set of one or more sensor readings over the first time period and the second set of one or more sensor readings may be identified. A correspondence between certain detected water flows, the operation of certain water-supplied devices, and/or the presence/certain locations of occupants in the home may be determined. Various embodiments may allow for varying degrees of localizing certain detected water flows, depending on the configuration a number of sensors in various embodiments.

As indicated by block 1110, one or more activity profiles may be generated based at least in part on the correlations. Activity profiles may identify any suitable information indicative of activity circumstances with respect to one or a combination of: the operation of certain water-supplied devices; the presence/locations of occupants in the home; time of day; time of year; and/or the like. As indicated by block 1112, one or more water use profiles may be generated based at least in part on one or more of the activity profiles. Water use profiles may reflect water flow trends corresponding to the various circumstances identified with the activity profiles. Accordingly, water use profiles may identify any suitable information indicative of water use with respect to one or a combination of: the operation of certain water-supplied devices; the presence/locations of occupants in the home; time of day; time of year; and/or the like. Accordingly, a water use profiles may indicate circumstance-specific baseline.

As indicated by block 1114, one or more thresholds may be identified based at least in part on one or more of the water use profiles. Any suitable threshold may be employed in various embodiments (e.g., maximum flow for a time period based on a water use profile, which include a margin above one or more detected maximums). The thresholds may be retained in association with particular activity profiles to represent circumstance-specific thresholds.

As indicated by block 1116, water use and activity at the home may be monitored. For example, the monitoring may be performed with the first set of one or more sensors, the second set of one or more sensors, and/or other sensors. As indicated by block 1118, a water leak condition may be determined based at least in part on the monitoring. For example, in some embodiments, determining a water leak condition may involve the following. Monitored activity may be matched to a particular activity profile. One or more thresholds associated to the particular activity profile may be identified. Monitored sensor readings indicative of water use to may be compared to at least one threshold. Consequent to determining that the at least one threshold is satisfied, a water leak condition may be determined to exist.

As indicated by block 1120, in some embodiments, transmission of a user notification may be caused to indicate the water leak condition via one or more notification interfaces. In some embodiments, one or more user-selectable options may be presented with the notification, as disclosed herein. In some embodiments, user may be presented with options for providing feedback on notifications. For example, one or more user-selectable options may be provided via the notification interface(s) to decline adjustments, rate adjustments, change adjustments, or otherwise indicate preferences and/or define operating modes. Such feedback may be used to adjust thresholds (e.g., increase a threshold by a particular amount so as not trigger unwanted notifications in the future).

As indicated by block 1122, in some embodiments, an adjustment to address the water leak condition may be determined. In some embodiments, such a determination may be based on localization such that the most downstream water supply controller that can address the water leak condition may be selected. As indicated by block 1124, the selected water supply controller may be caused to shut off water supply to the portion of the water supply system experiencing the water leak. In some embodiments, whether the water supply is shut off is contingent on user direction received responsive to the user-selectable options. In some embodiments, if no response to a user notification is received within a threshold period of time, the water supply may be automatically shut, and, in some embodiments, such automatic shut-off is contingent on the water flow corresponding to the water leak condition satisfying a threshold (e.g., a volume and/or flow threshold).

Figure 12:
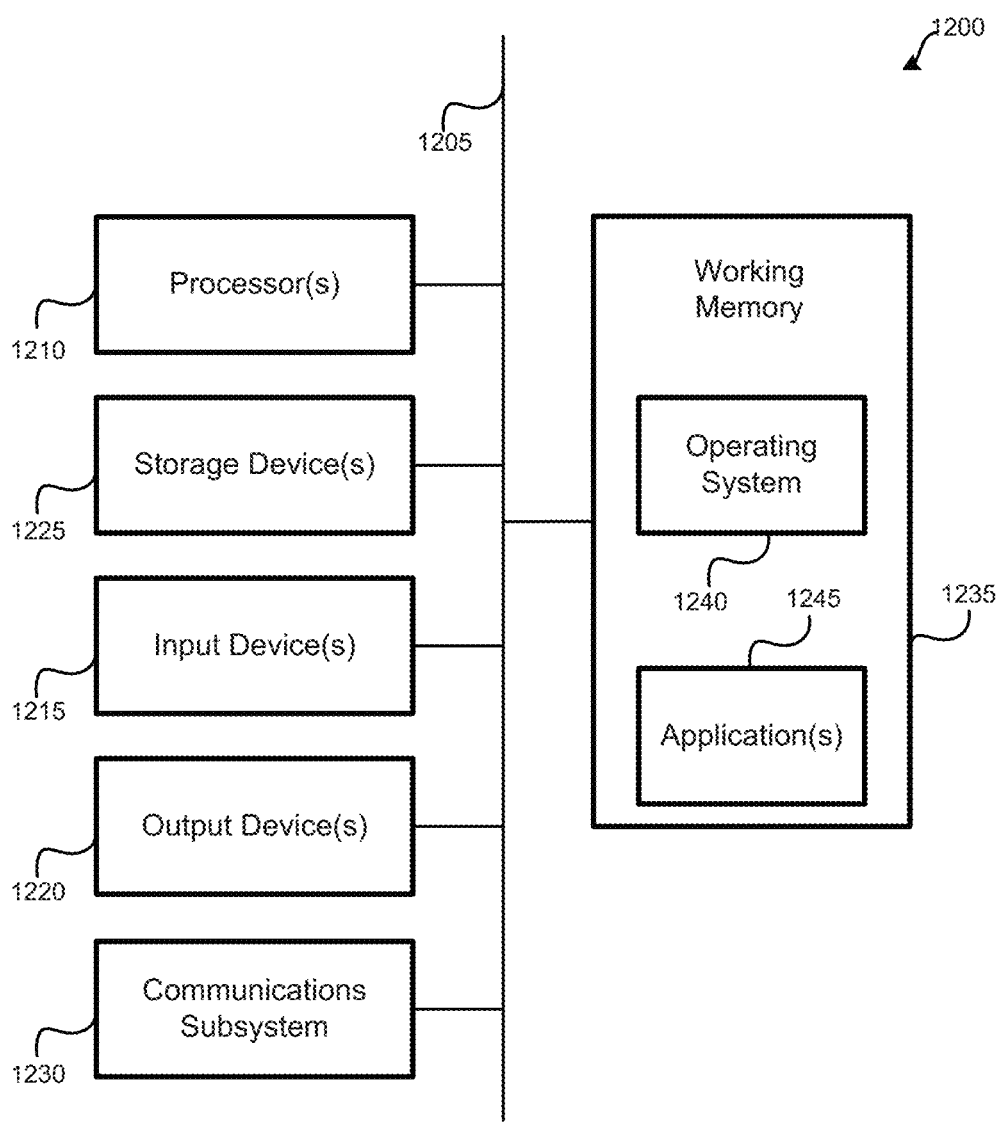
FIG. 12 illustrates an embodiment of a computer system, in accordance with certain embodiments of the present disclosure.

A computer system as illustrated in FIG. 12 may be incorporated as part of the previously described computerized devices, such as the wireless devices, television receivers, overlay devices, communication devices, any of the home automation devices, the television service provider system, etc. FIG. 12 provides a schematic illustration of one embodiment of a computer system 1200 that can perform various steps of the methods provided by various embodiments. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, video decoders, and/or the like); one or more input devices 1215, which can include without limitation a mouse, a keyboard, remote control, and/or the like; and one or more output devices 1220, which can include without limitation a display device, a printer, and/or the like.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 1230 may permit data to be exchanged with a network (such as the network described below, to name one example), other computer systems, and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1225 described above. In some cases, the storage medium might be incorporated within a computer system, such as computer system 1200. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1200) to perform methods in accordance with various embodiments of the invention. According to a set of embodiments, some or all of the procedures of such methods are performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the non-transitory storage device(s) 1225. Merely by way of example, execution of the sequences of instructions contained in the working memory 1235 might cause the processor(s) 1210 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 1200, various computer-readable media might be involved in providing instructions/code to processor(s) 1210 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1225. Volatile media include, without limitation, dynamic memory, such as the working memory 1235.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200.

The communications subsystem 1230 (and/or components thereof) generally will receive signals, and the bus 1205 then might carry the signals (and/or the data, instructions, etc. carried by the signals) to the working memory 1235, from which the processor(s) 1210 retrieves and executes the instructions. The instructions received by the working memory 1235 may optionally be stored on a non-transitory storage device 1225 either before or after execution by the processor(s) 1210.

It should further be understood that the components of computer system 1200 can be distributed across a network. For example, some processing may be performed in one location using a first processor while other processing may be performed by another processor remote from the first processor. Other components of computer system 1200 may be similarly distributed. As such, computer system 1200 may be interpreted as a distributed computing system that performs processing in multiple locations. In some instances, computer system 1200 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for automation control for water leaks, the method comprising:
   receiving, by a control device, a first set of one or more sensor readings from a first set of one or more sensors disposed about one or more water supply lines at a home, the first set of one or more sensors to detect a type of one or more metrics indicative of water flow;
   recording, by the control device, the first set of one or more sensor readings over a time period;
   receiving, by the control device, a second set of one or more sensor readings from a second set of one or more sensors disposed at the home, the second set of one or more sensors to detect presence and/or locations of one or more occupants at the home;
   identifying, by the control device, a correlation between the first set of one or more sensor readings indicative of the water flow over the time period and the second set of one or more sensor readings indicative of the presence and/or the locations of the one or more occupants at the home;
   generating, by the control device, an activity profile based at least in part on the correlation;
   generating, by the control device, a water use profile based at least in part on the activity profile, wherein the water use profile indicates water flow trends corresponding to circumstances identified with the activity profile;
   identifying, by the control device, a set of one or more thresholds based at least in part on the water use profile;
   retaining, by the control device, the set of one or more thresholds in association with the activity profile;
   monitoring, by the control device, water use at the home at least in part with the first set of one or more sensors and activity at the home at least in part with the second set of one or more sensors;
   determining, by the control device, a water leak condition based at least in part on the monitoring, wherein the determining the water leak condition comprises:
      matching monitored activity to the activity profile;
      comparing a third set of one or more sensor readings indicative of monitored water use to at least one threshold of the set of one or more thresholds; and
      determining that the at least one threshold is satisfied;
   determining, by the control device, an adjustment to address the water leak condition; and
   causing, by the control device, a water supply controller to make the adjustment, wherein the adjustment comprises shutting off a water supply.

2. The method for automation control for water leaks of claim 1, further comprising:
   causing, by the control device, transmission of a user notification to indicate the water leak condition via one or more notification interfaces.

3. The method for automation control for water leaks of claim 1, further comprising:
   processing, by the control device, one or more user selections corresponding to one or more user-selection options;
   wherein the causing the water supply controller to make the adjustment is based in part on the one or more user selections.

4. The method for automation control for water leaks of claim 1, further comprising:
   processing, by the control device, one or more user selections corresponding to one or more user-selection options; and
   modifying, by the control device, the set of one or more thresholds based in part on the one or more user selections.

5. The method for automation control for water leaks of claim 1, wherein the second set of one or more sensor readings from the second set of one or more sensors indicates the locations of the one or more occupants of the home.

6. A system for automation control for water leaks, the system comprising:
   a control device communicatively coupled to:
      a first set of one or more sensors disposed about one or more water supply lines at a home, the first set of one or more sensors to detect a type of one or more metrics indicative of water flow; and
      a second set of one or more sensors disposed at the home;
   the control device comprising:
      one or more processors;
      a memory communicatively coupled with and readable by the one or more processors and having stored therein processor-readable instructions which, when executed by the one or more processors, cause the one or more processors to:
         receive a first set of one or more sensor readings from the first set of one or more sensors;
         record the first set of one or more sensor readings over a time period;
         receive a second set of one or more sensor readings from the second set of one or more sensors disposed at the home, the second set of one or more sensors to detect presence and/or locations of one or more occupants at the home;
         identify a correlation between the first set of one or more sensor readings indicative of the water flow over the time period and the second set of one or more sensor readings indicative of the presence and/or the locations of the one or more occupants at the home;
         generate an activity profile based at least in part on the correlation;
         generate a water use profile based at least in part on the activity profile, wherein the water use profile indicates water flow trends corresponding to circumstances identified with the activity profile;
         identify a set of one or more thresholds based at least in part on the water use profile;
         retain the set of one or more thresholds in association with the activity profile;
         monitor water use at the home at least in part with the first set of one or more sensors and activity at the home at least in part with the second set of one or more sensors;
         determine a water leak condition based at least in part on the monitoring, wherein the determining the water leak condition comprises:
            matching monitored activity to the activity profile;
            comparing a third set of one or more sensor readings indicative of monitored water use to at least one threshold of the set of one or more thresholds; and
            determining that the at least one threshold is satisfied;
         determine an adjustment to address the water leak condition; and
         cause a water supply controller to make the adjustment, wherein the adjustment comprises shutting off a water supply.

7. The system for automation control for water leaks of claim 6, wherein the processor-readable instructions further cause the one or more processors to:
   cause transmission of a user notification to indicate the water leak condition via one or more notification interfaces.

8. The system for automation control for water leaks of claim 6, wherein the processor-readable instructions further cause the one or more processors to:
   process one or more user selections corresponding to one or more user-selection options;
   wherein the causing the water supply controller to make the adjustment is based in part on the one or more user selections.

9. The system for automation control for water leaks of claim 6, wherein the processor-readable instructions further cause the one or more processors to:
   process one or more user selections corresponding to one or more user-selection options; and
   modifying the set of one or more thresholds based in part on the one or more user selections.

10. The system for automation control for water leaks of claim 6, wherein the second set of one or more sensor readings from the second set of one or more sensors indicates the locations of the one or more occupants of the home.

11. One or more non-transitory, machine-readable media having machine-readable instructions thereon which, when executed by one or more processing devices, facilitates automation control for water leaks, causing the one or more processing devices to:
   receive a first set of one or more sensor readings from a first set of one or more sensors disposed about one or more water supply lines at a home, the first set of one or more sensors to detect a type of one or more metrics indicative of water flow;
   record the first set of one or more sensor readings over a time period;
   receive a second set of one or more sensor readings from a second set of one or more sensors disposed at the home, the second set of one or more sensors to detect presence and/or locations of one or more occupants at the home;
   identify a correlation between the first set of one or more sensor readings indicative of the water flow over the time period and the second set of one or more sensor readings indicative of the presence and/or the locations of the one or more occupants at the home;
   generate an activity profile based at least in part on the correlation;
   generate a water use profile based at least in part on the activity profile, wherein the water use profile indicates water flow trends corresponding to circumstances identified with the activity profile;
   identify a set of one or more thresholds based at least in part on the water use profile;
   retain the set of one or more thresholds in association with the activity profile;
   monitor water use at the home at least in part with the first set of one or more sensors and activity at the home at least in part with the second set of one or more sensors;
   determine a water leak condition based at least in part on the monitoring, wherein the determining the water leak condition comprises:
      matching monitored activity to the activity profile;
      comparing a third set of one or more sensor readings indicative of monitored water use to at least one threshold of the set of one or more thresholds; and
      determining that the at least one threshold is satisfied;
   determine an adjustment to address the water leak condition; and
   cause a water supply controller to make the adjustment, wherein the adjustment comprises shutting off a water supply.

12. The one or more non-transitory, machine-readable media of claim 11, wherein the machine-readable instructions further cause the one or more processing devices to:
   cause transmission of a user notification to indicate the water leak condition via one or more notification interfaces.

13. The one or more non-transitory, machine-readable media of claim 11, wherein the machine-readable instructions further cause the one or more processing devices to:
   process one or more user selections corresponding to one or more user-selection options;
   wherein the causing the water supply controller to make the adjustment is based in part on the one or more user selections.

14. The one or more non-transitory, machine-readable media of claim 11, wherein the second set of one or more sensor readings from the second set of one or more sensors indicates the locations of the one or more occupants of the home.

* * * * *